US010415225B2

(12) United States Patent
Zarraonandia

(10) Patent No.: US 10,415,225 B2
(45) Date of Patent: Sep. 17, 2019

(54) STORMWATER MANAGEMENT SYSTEM

(71) Applicant: Pre-Con Products, Simi Valley, CA (US)

(72) Inventor: David Zarraonandia, Thousand Oaks, CA (US)

(73) Assignee: PRE-CON PRODUCTS, Simi Valley, CA (US)

( * ) Notice: Subject to any disclaimer, the term of this patent is extended or adjusted under 35 U.S.C. 154(b) by 0 days.

(21) Appl. No.: 15/352,902

(22) Filed: Nov. 16, 2016

(65) Prior Publication Data
US 2018/0135292 A1 May 17, 2018

(51) Int. Cl.
*E03F 1/00* (2006.01)
*E03F 5/10* (2006.01)

(52) U.S. Cl.
CPC .............. *E03F 1/005* (2013.01); *E03F 5/101* (2013.01); *Y02A 20/106* (2018.01); *Y02A 20/108* (2018.01)

(58) Field of Classification Search
CPC . E03F 1/005; E03F 5/101; E03F 1/003; E03F 5/106; E01F 5/005; E01F 5/00; E02B 11/005; E02B 11/00; E02B 13/00
See application file for complete search history.

(56) References Cited

U.S. PATENT DOCUMENTS

| | | | | |
|---|---|---|---|---|
| 3,799,383 A | * | 3/1974 | Gerhard | B65D 88/128 220/1.5 |
| 4,983,069 A | * | 1/1991 | Florence | E03F 1/005 405/36 |
| 6,648,549 B1 | * | 11/2003 | Urriola | E03F 1/005 210/170.03 |
| 6,779,946 B1 | * | 8/2004 | Urriola | E01C 9/004 404/2 |
| 6,991,402 B2 | * | 1/2006 | Burkhart | E03F 1/005 405/126 |
| 7,160,058 B2 | | 1/2007 | Burkhart | |
| 7,344,335 B2 | | 3/2008 | Burkhart | |
| 7,387,467 B2 | | 6/2008 | Kelty | |
| 7,704,011 B2 | | 4/2010 | Marshall | |
| D617,867 S | | 6/2010 | May | |
| 7,762,205 B1 | | 7/2010 | Veazey | |
| 7,798,747 B1 | | 9/2010 | de Bruijn et al. | |
| 8,360,100 B2 | * | 1/2013 | Burkhart, Sr. | E03F 5/101 137/265 |
| 8,590,564 B2 | | 11/2013 | Burkhart, Sr. et al. | |
| 8,770,890 B2 | | 7/2014 | May et al. | |
| 8,985,897 B2 | | 3/2015 | Boulton et al. | |

(Continued)

*Primary Examiner* — Carib A Oquendo
(74) *Attorney, Agent, or Firm* — Thompson Coburn LLP

(57) ABSTRACT

A stormwater management system includes a plurality of first cells arranged in a lower level and a plurality of second cells arranged in an upper level, each of the first cells having a body portion with an internal region, the first cells in fluid communication with one another, each of the second cells having a body portion having an inner surface with a substantially cylindrical shape and defining an internal region, each of the second cells stacked on a corresponding one of the first cells, the first cells and the second cells in combination constituting a plurality of stacked pairs, for each stacked pair the internal region of the first cell is in fluid communication with the internal region of the second cell to permit stormwater to flow from the internal region of the first cell to the internal region of the second cell.

20 Claims, 26 Drawing Sheets

(56) References Cited

U.S. PATENT DOCUMENTS

| | | | |
|---|---|---|---|
| 2005/0100401 A1 | 5/2005 | Urriola et al. | |
| 2007/0227094 A1 | 10/2007 | Oscar | |
| 2008/0044231 A1 | 2/2008 | Roelfsema | |
| 2009/0279953 A1* | 11/2009 | Allard | E03F 1/005 405/39 |
| 2010/0221068 A1* | 9/2010 | Burkhart, Sr. | E03F 1/002 405/36 |
| 2010/0226721 A1* | 9/2010 | May | E03F 1/002 405/126 |
| 2012/0201603 A1* | 8/2012 | Boulton | E03F 1/005 405/36 |
| 2014/0105684 A1* | 4/2014 | Allard | E03F 1/005 405/52 |

* cited by examiner

STORMWATER MANAGEMENT SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable

BACKGROUND

Field of the Invention

The present invention pertains to a cell for a stormwater management system adapted for retaining or detaining stormwater.

SUMMARY

One aspect of the present disclosure is a stormwater management system including a plurality of first cells and a plurality of second cells. The plurality of first cells are arranged in a lower level, with each of the first cells having a body portion with an internal region. The first cells of the lower level are in fluid communication with one another to allow stormwater to flow from the internal region of one of the first cells to the internal region of another of the first cells. The plurality of second cells are arranged in an upper level, with each of the second cells having a body portion having an inner surface. The inner surface of each of the second cells has a substantially cylindrical shape and defines an internal region. Each of the second cells is stacked on a corresponding one of the first cells, with the first cells and the second cells in combination constituting a plurality of stacked pairs. Each stacked pair of the plurality of stacked pairs includes one of the first cells and one of the second cells. The first cells and the second cells are shaped and arranged such that for each stacked pair the internal region of the first cell is in fluid communication with the internal region of the second cell to permit stormwater to flow from the internal region of the first cell to the internal region of the second cell.

BRIEF DESCRIPTION OF THE DRAWINGS

FIG. 14b is an elevational view of the upper cell and the lower cell shown in FIG. 14a.

Figure 1:
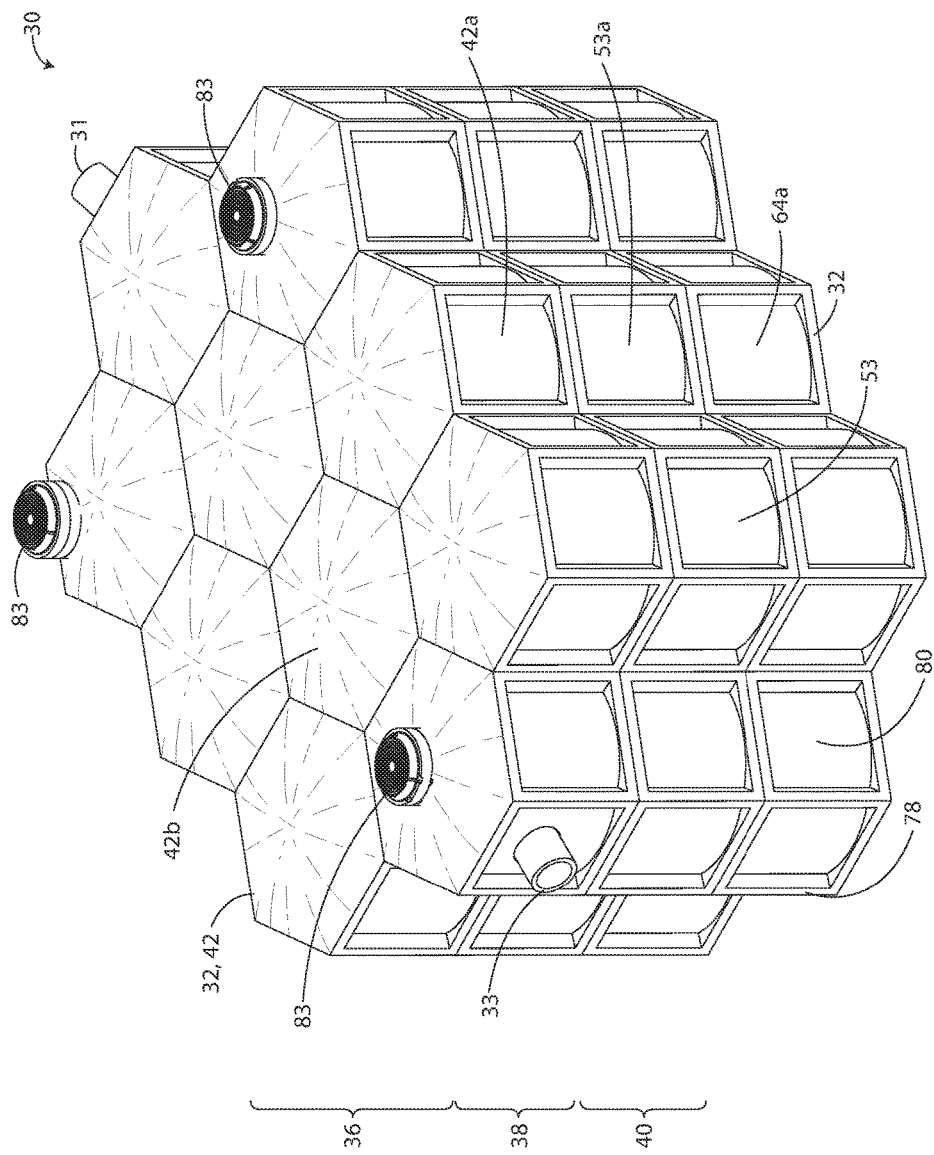
FIG. 1 is a perspective view of an embodiment of a stormwater management system of the present invention, the stormwater management system having a lower level of cells, an upper level of cells, and an intermediate level of cells.

Reference numerals in the written specification and in the drawing figures indicate corresponding items.

DETAILED DESCRIPTION OF THE PREFERRED

U.S. patent application Ser. No. 14/710,230, filed May 12, 2015 and U.S. patent application Ser. No. 15/043,032, filed Feb. 12, 2016 are both incorporated herein in their entireties.

An embodiment of a stormwater management system is shown in FIGS. 1-4 and indicated generally by reference numeral 30. The stormwater management system 30 is adapted for retaining or detaining stormwater. The stormwater management system 30 comprises an inlet 31 and an outlet 33. The inlet 31 is adapted to enable stormwater to enter the stormwater management system 30 and the outlet 33 is adapted to enable stormwater to be removed from the stormwater management system. One of ordinary skill in the art will understand that the location of the inlet and the location of the outlet could be different from that shown in FIGS. 1 and 2. Moreover, one of ordinary skill in the art will understand that the stormwater management system could comprise additional inlets and/or outlets.

Figure 3:
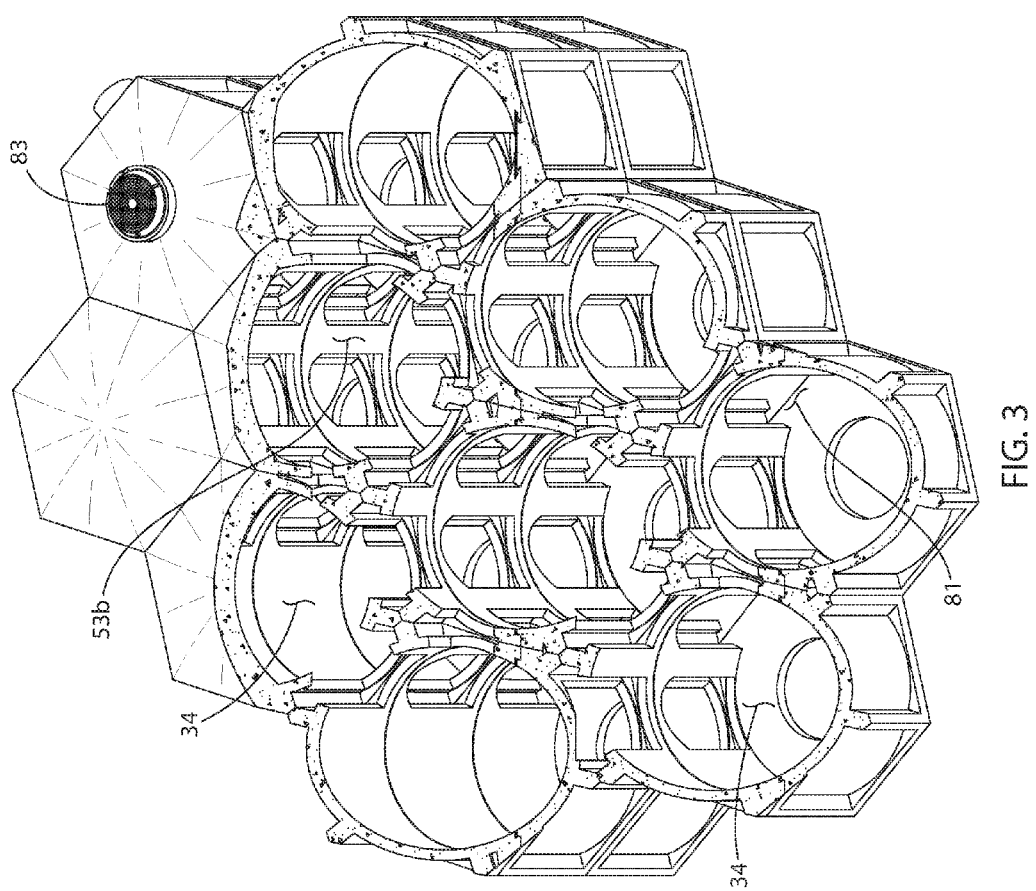
FIG. 3 is a perspective view of the stormwater management system of FIG. 1 with portions broken away to show detail.
Figure 4:
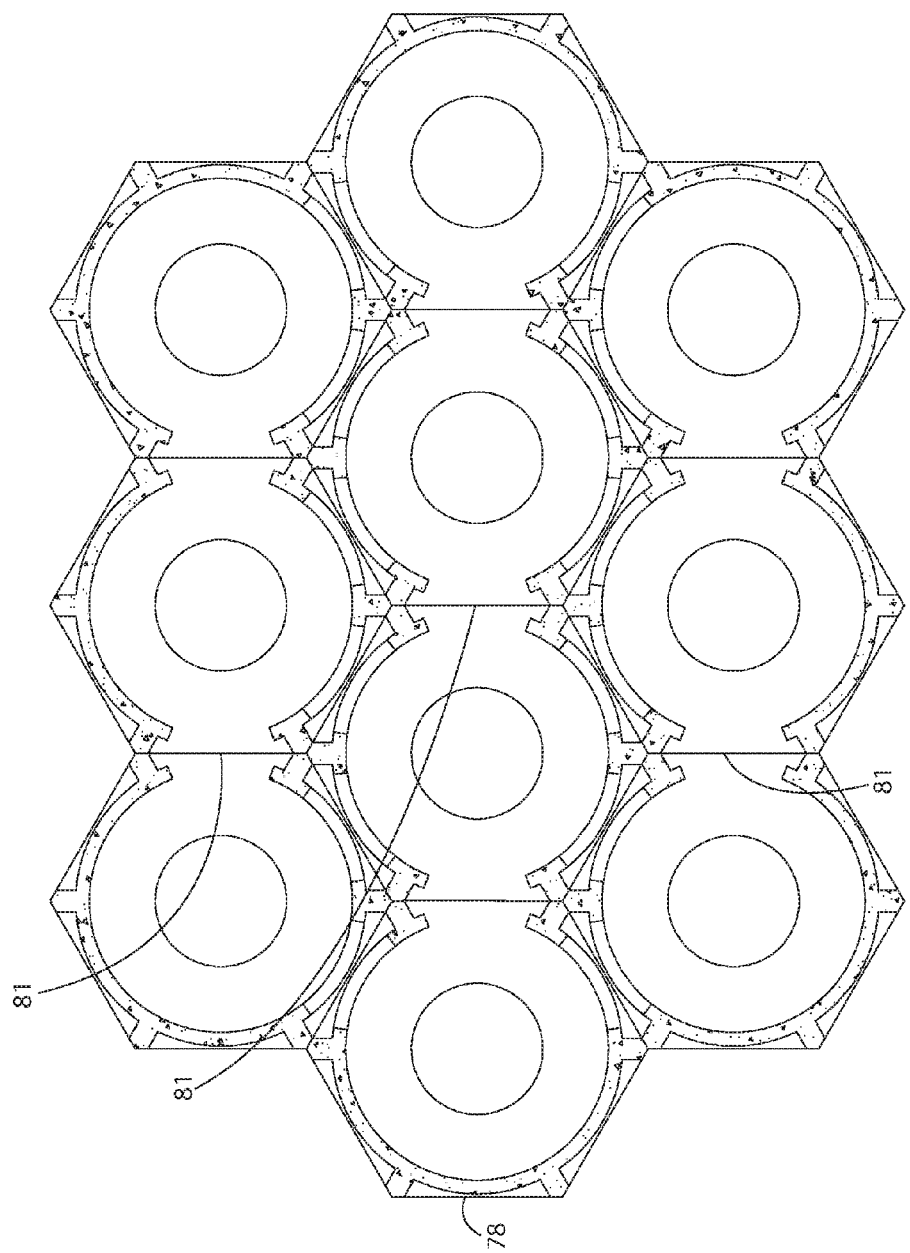
FIG. 4 is a cross-sectional view taken along the plane of line 4-4 of FIG. 2.

The stormwater management system 30 comprises a plurality of cells 32. Each cell 32 is made from a material suitable for use within a stormwater management system, including, but not limited to, concrete. The plurality of cells 32 are arranged in a generally honeycomb configuration. As can be seen in FIGS. 3 and 4, each of the plurality of cells 32 is generally hexagonal in cross-section and has an internal region 34. Moreover, each cell within the stormwater management system 30 is a module (i.e., of a unitary, one piece construction). It is to be understood, however, that the stormwater management system 30 could be constructed such that each cell (or alternatively, each of some of the cells) is made of separate pieces that collectively fit together to form a cell. The plurality of cells 32 are in fluid communication with one another to allow stormwater to flow from the internal region of one of the plurality of cells to the internal region of another of the plurality of cells.

Figure 2:
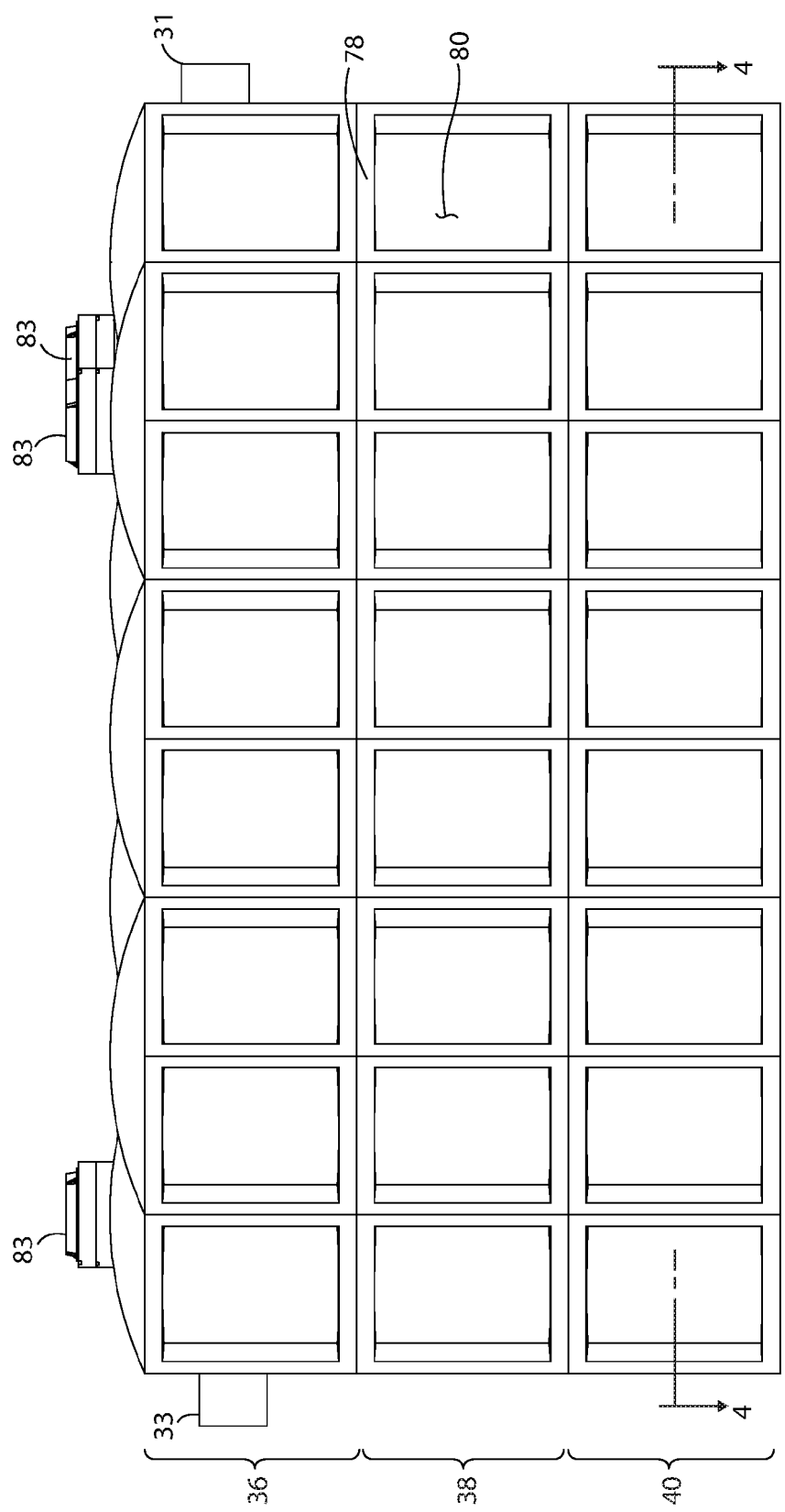
FIG. 2 is a side elevational view of the stormwater management system of FIG. 1.

As shown in FIGS. 1 and 2, the plurality of cells 32 comprises an upper level of cells 36, an intermediate level of cells 38, and a lower level of cells 40. The upper level of cells 36 is over the intermediate level of cells 38. Additionally, the upper level of cells 36 is in fluid communication with the intermediate level of cells 38. The intermediate level of cells 38 is over the lower level of cells 40. Additionally, the intermediate level of cells 38 is in fluid communication with the lower level of cells 40. Accordingly, the upper level of cells 36 is in fluid communication with the lower level of cells 40 via the intermediate level of cells 38.

Figure 5:
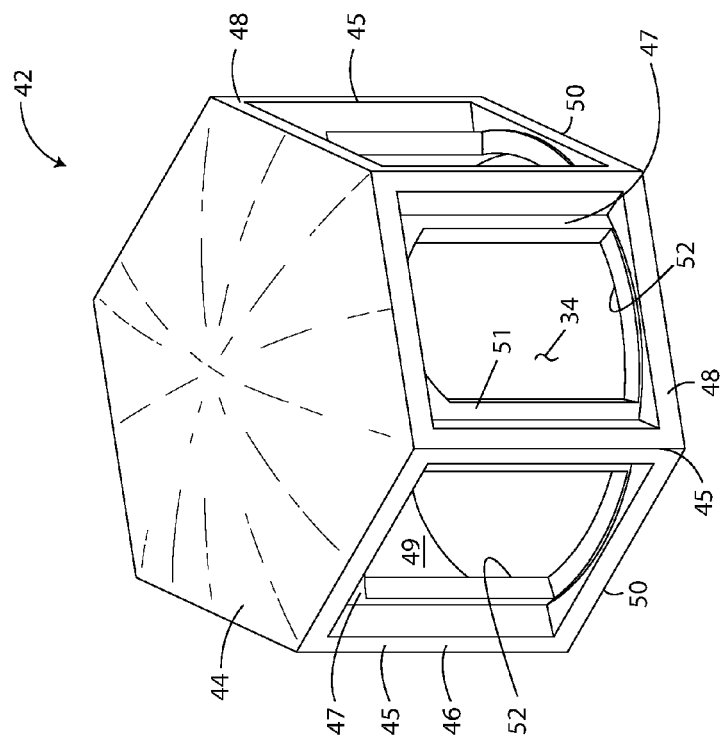
FIG. 5 is a perspective view of one of the cells of the upper level of cells of the stormwater management system of FIG. 1.

An exemplary cell 42 located within the upper level of cells 36 is shown in FIG. 5. Cell 42 comprises a top portion 44 and a body portion 46. The top portion 44 and the body portion 46 bound the internal region 34 of cell 42. The top portion 44 and the body portion 46 are generally hexagonal in cross-section. Although the cell 42 of the present embodiment is a module of a molded, one-piece construction, it is to be understood that the top portion 44 and the body portion 46 could be separate pieces that fit together to collectively form cell 42. The top portion 44 of cell 42 is domed such that an inner surface (not shown) of the top portion is concave. It is to be understood that the top portion 44 of cell 42 could alternatively be substantially flat. The body portion 46 includes six corner columns 45 spaced from each other, six sides 48, and a plurality of windows 52. Each side 48 comprises a wall portion 47. Each wall portion 47 extends from one of the corner columns 45 to another of the corner columns. Each wall portion 47 comprises an inner surface 49 and an outer surface 51. The inner surface 49 and the outer surface 51 of each wall portion 47 is curved. More specifically, the inner surface 49 and the outer surface 51 of each wall portion 47 is arcuate. The inner surfaces 49 of the plurality of wall portions 47 collectively constitute an interior surface. The interior surface is of a shape that is generally a right circular cylinder. The interior surface at least partially surrounds the internal region 34 of the cell 42. The body portion 46 further comprises a bottom edge 50. The body portion 46 is generally in the shape of a hexagonal cylinder. More specifically, the body portion 46 is generally in the shape of an equilateral hexagonal cylinder. Each window 52 is in a different one of the six sides 48 and through a wall portion 47. Additionally, each window is spaced from the top portion 44 and the bottom edge 50. Additionally, each window 52 is adapted to permit the passage of stormwater into and out of the internal region 34 of cell 42. Although FIG. 5 shows that each window 52 is of the same arched dimension, it is to be understood that the windows could be of different dimensions. Preferably, each window is dimensioned such that an area of each window is at least 50% of an area of the side of the cell in which each window is located. More preferably, each window is dimensioned such that an area of each window is at least 60% of an area of the side in which each window is located. It is also to be understood that a cell could have more or fewer windows than that of cell 42. For example, cell 42*a* has four windows and cell 42*b* has six windows (see FIG. 1).

Figure 6:
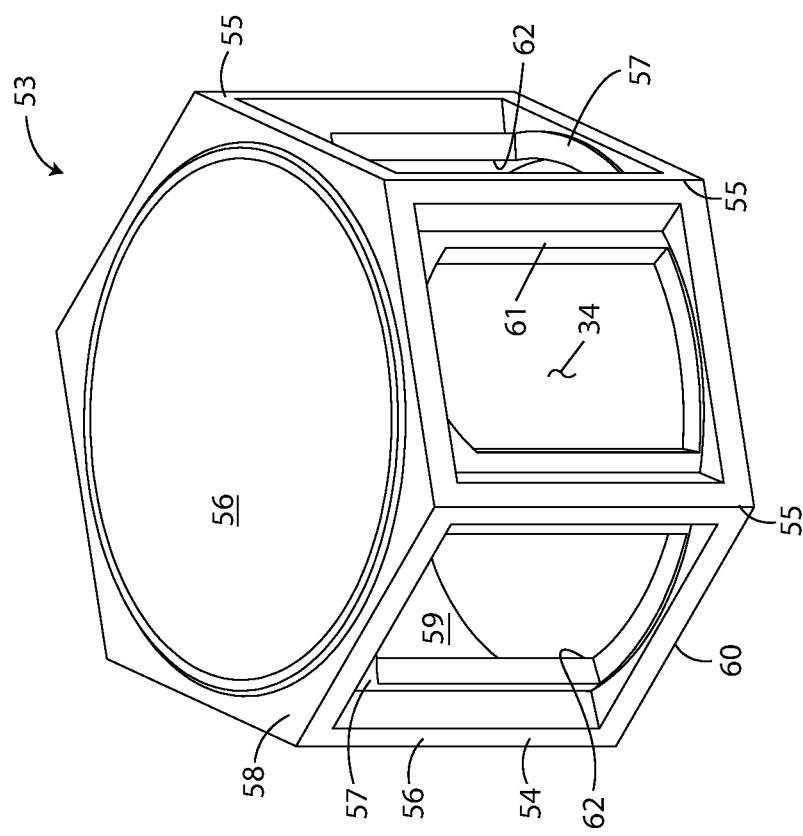
FIG. 6 is a perspective view of one of the cells of the intermediate level of cells of the stormwater management system of FIG. 1.

An exemplary cell 53 located within the intermediate level of cells 38 is shown in FIG. 6. Cell 53 comprises a body portion 54 having six corner columns 55, six sides 56, a top edge 58, a bottom edge 60, and a plurality of windows 62. The body portion 54 bounds the internal region 34 of cell 53. Each side 56 comprises a wall portion 57. Each wall portion 57 extends from one of the corner columns 55 to another of the corner columns. Each wall portion 57 comprises an inner surface 59 and an outer surface 61. The inner surface 59 and the outer surface 61 of each wall portion 57 is curved. More specifically, the inner surface 59 and the outer surface 61 of each wall portion 57 is arcuate. The inner surface 59 of the plurality of wall portions 57 collectively constitute an interior surface. The interior surface is of a shape that is generally a right circular cylinder. The interior surface at least partially surrounds the internal region 34 of the cell 53. The body portion 54 is generally in the shape of a hexagonal cylinder. More specifically, the body portion 54 is generally in the shape of an equilateral hexagonal cylinder. Each window 62 is in a different one of the six sides 56 and through a wall portion 57. Additionally, each window 62 is spaced from the top and bottom edges 58, 60 of the body portion 54. Additionally, each window 62 is adapted to permit the passage of stormwater into and out of the internal region 34 of cell 53. Although FIG. 6 shows that each window 62 is of the same arched dimension, it is to be understood that the windows could be of different dimensions. It is also to be understood that a cell could have more or fewer windows that that of cell 53. For example, cell 53*a* in FIG. 1 has four windows and cell 53*b* in FIG. 3 has six windows.

Figure 7:
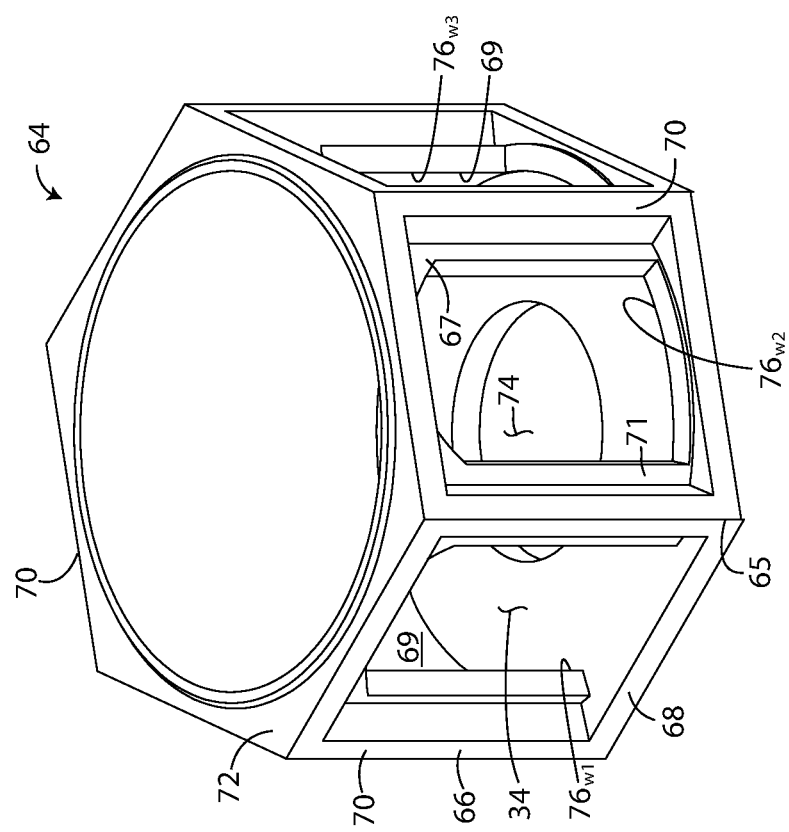
FIG. 7 is a perspective view of one of the cells of the lower level of cells of the stormwater management system of FIG. 1.

An embodiment of an individual cell 64 located within the lower level of cells 40 is shown in FIG. 7. Cell 64 comprises a body portion 66 and a bottom portion 68 that are generally hexagonal in cross-section. The body portion 66 and the bottom portion 68 bound the internal region 34 of cell 64. The body portion 66 includes six corner columns 65 spaced from each other, six sides 70, a top edge 72, and a plurality of windows 76. Each side 70 comprises a wall portion 67. Each wall portion 67 extends from one of the corner columns 65 to another of the corner columns. Each wall portion 67 comprises an inner surface 69 and an outer surface 71. The inner surface 69 and the outer surface 71 of each wall portion 67 is curved. More specifically, the inner surface 69 and the outer surface 71 of each wall portion 67 is arcuate. The inner surfaces 69 of the plurality of wall portions 67 collectively constitute an interior surface. The interior surface is of a shape that is generally a right circular cylinder. The interior surface at least partially surrounds the internal region 34 of cell 64. Although the cell 64 of the present embodiment is a module, it is to be understood that the bottom portion 68 and the body portion 66 could be separate pieces that fit together to collectively form cell 64. The body portion 66 is generally in the shape of a hexagonal cylinder. More specifically, the body portion 66 is generally in the shape of an equilateral hexagonal cylinder. The bottom portion 68 of cell 64 is substantially flat and constitutes a floor for the cell. The bottom portion 68 has an opening 74 that is adapted such that stormwater can pass therethrough and flow out of the internal region 34 of cell 64. Cell 64 has a first window $76_{W1}$, a second window $76_{W2}$, and a third window $76_{W3}$. As shown in FIG. 7, each window 76 is in a different one of the six sides 70 and through a wall portion 67. The first window $76_{W1}$ is spaced from the top edge 72. The second and third windows $76_{W2}$, $76_{W3}$ are spaced from the top edge 72 and the bottom portion 68. Each window 76 is adapted to permit passage of stormwater into and out of the internal region 34 of cell 64. Although FIG. 7 shows that each window 76 is of the same arched dimension, it is to be understood that the windows could be of different dimensions. It is to be understood that a cell could have more or fewer windows than that of cell 64. For example, cell 64a in FIG. 1 contains four windows.

As can be seen in FIG. 3, a body portion of each of the plurality of cells 32 within the stormwater management system 30 is substantially the same size as the body portion of the other cells within the stormwater management system. It is to be understood, however, that the body portion of at least some of the cells could be of a different size. Moreover, as can be seen in FIGS. 1-3, the plurality of cells 32 within the stormwater management system 30 are arranged in a manner such that the plurality of cells constitute a network having an outer periphery 78. Some of the sides of the plurality of cells 32 located along an outer edge of the stormwater management system 30 constitute the outer periphery 78. The cells 32 of the stormwater management system 30 are preferably arranged such that the outer periphery 78 does not contain any windows. Each side constituting the outer periphery 78 of the stormwater management system 30 preferably comprises a wall portion 80 that is curved. It is to be understood, however, that some or all of the sides that constitute the outer periphery 78 of the stormwater management system 30 could be substantially flat.

As shown in FIGS. 3 and 4, the lower level of cells 40 of the stormwater management system 30 are arranged in a manner so as to form a plurality of parallel walkways 81. Each walkway 81 extends in a single direction from a first side of the stormwater management system to an opposite side of the stormwater management system. Each walkway 81 enables a user to pass from the internal region 34 of one cell within the lower level of cells 40 to the internal region of another cell within the lower level of cells 40 without having to step over a raised surface. A user is able to gain access to the underground system 30 via a plurality of port holes 83 located within the upper level of cells 36.

The stormwater management system 30 is formed by arranging the lower level of cells 40, the intermediate level of cells 38, and the upper level of cells 36 in a generally honeycomb configuration. The intermediate level of cells 38 is arranged between the lower level of cells 40 and the upper level of cells 36. The upper level of cells 36 is arranged such that each one of the top portions 44 is in contact with the top portion 44 of another cell. Some of the upper level of cells 36 are arranged such that the top portions 44 of the cells are in contact with the top portions 44 of at least two other cells.

Figure 8:
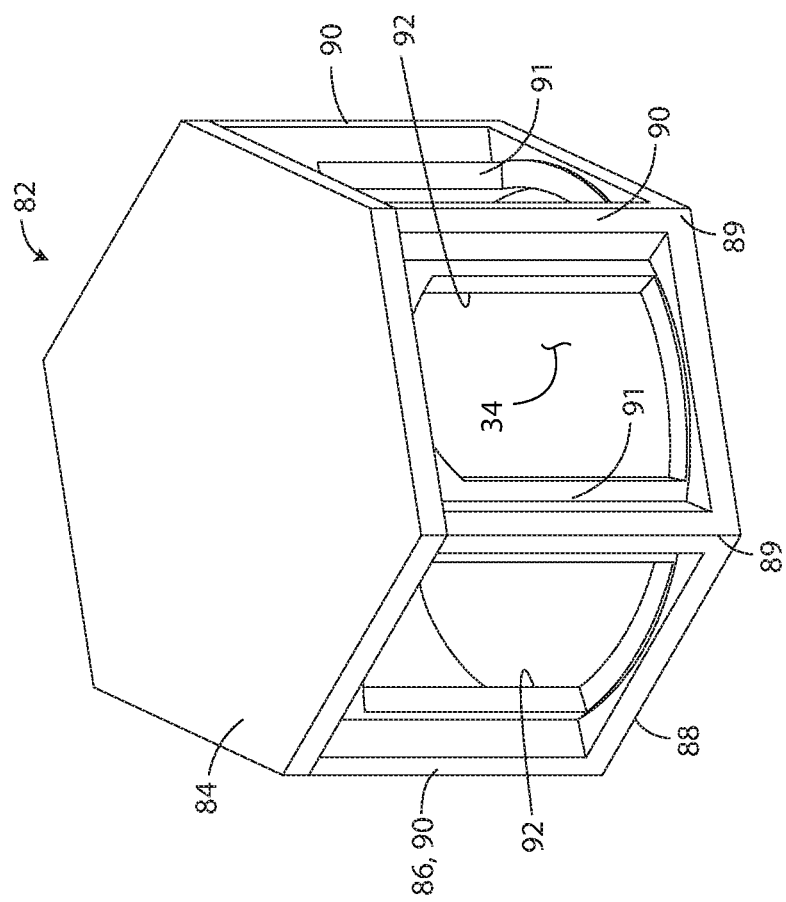
FIG. 8 is a perspective view of another embodiment of a cell of the present invention, the cell of FIG. 8 being similar to the cell of FIG. 5 but having a flat top portion.

Another embodiment of an individual cell 82 that could be located within the upper level of cells 36 is shown in FIG. 8. Cell 82 comprises a top portion 84, a body portion 86, and a bottom edge 88. The top portion 84 and the body portion 86 bound the internal region 34 of cell 82. Each of the top portion 84 and the body portion 86 is substantially hexagonal in cross-section. The top portion 84 of cell 82 is substantially flat. It is to be understood, however, that the top portion 84 of the cell 82 can be domed. Each of the body portion 86 and the top portion 84 are separate pieces that fit together to collectively form cell 82. The body portion 86 comprises six corner columns 89, six sides 90, and plurality of windows 92. Each side 90 comprises a wall portion 91. Each wall portion 91 extends from one of the corner columns 89 to another of the corner columns. Each window 92 is in a different one of the six sides 90 and through a wall portion 91. Each window is adapted to permit passage of stormwater into and out of the internal region 34 of cell 82. Although FIG. 8 shows that each window 92 is of the same arched dimension, it is to be understood that the windows could be of different dimensions. It is also to be understood a cell could have more or fewer windows than that of cell 82.

Figure 9:
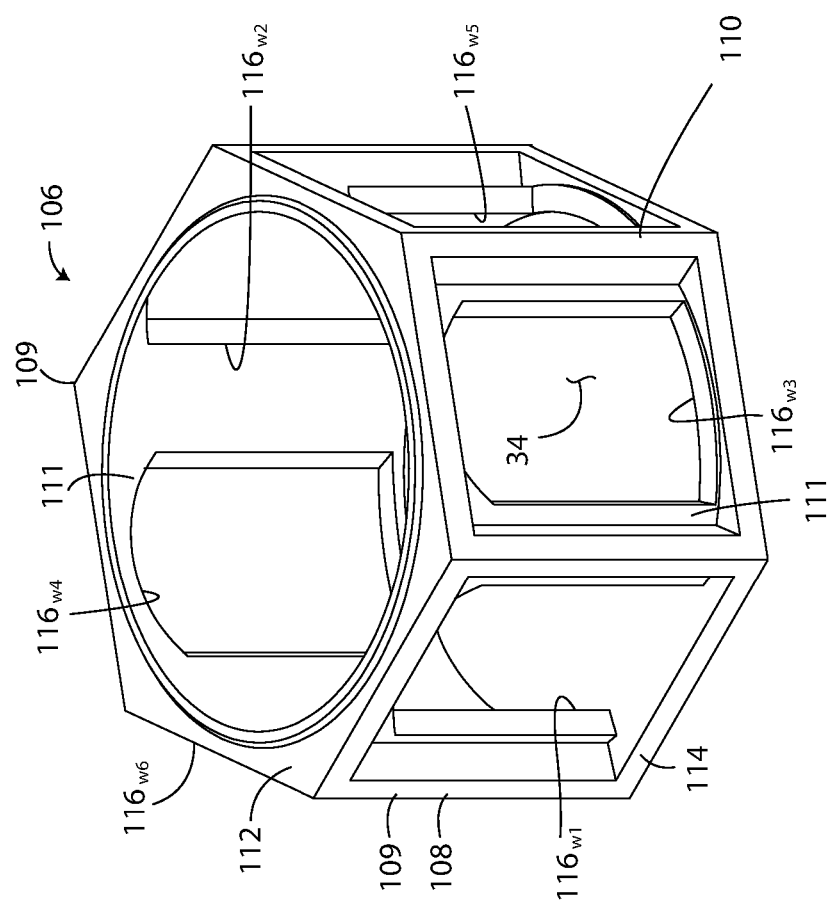
FIG. 9 is a perspective view of another embodiment of a cell of the present invention, the cell of FIG. 9 being similar to the cell of FIG. 7 but having a closed bottom portion.

An alternative embodiment of an individual cell 106 that could be located within the lower level of cells 40 is shown in FIG. 9. Cell 106 comprises a body portion 108 having six corner columns 109, six sides 110, a top edge 112, a bottom portion 114, and a plurality of windows 116. Each side 110 comprises a wall portion 111. Each wall portion 111 extends from one of the corner columns 109 to another of the corner columns. The body portion 108 comprises a first window $116_{W1}$, a second window $116_{W2}$, a third window $116_{W3}$, a forth window $116_{W4}$, a fifth window $116_{W5}$, and a sixth window $116_{W6}$. As shown in FIG. 9, each window is in a different one of the six sides 110 and through a wall portion 111. The first and second windows $116_{W1}$, $116_{W2}$ are opposite each other, the third and fourth windows $116_{W3}$, $116_{W4}$ are opposite each other, and the fifth and six windows $116_{W5}$, $116_{W6}$ are opposite each other. The first and second windows $116_{W1}$, $116_{W2}$ are spaced from the top edge 112 of the body portion 108. The first and second windows $116_{W1}$, $116_{W2}$ are not spaced from the bottom portion 114. The third, fourth, fifth, and sixth windows $104_{W3}$, $104_{W4}$, $104_{W5}$, $104_{W6}$ are spaced from the top edge 112 and bottom portion 114. The bottom portion 114 constitutes a floor for cell 106. Although FIG. 9 shows that each window is of the same arched dimension, it is to be understood the windows could be of different dimensions. It is also to be understood that a cell could have more or fewer windows than that of cell 106.

One of ordinary skill in the art will appreciate that the upper level of cells 36 within the stormwater management system 30 could be assembled of cells consistent with cell embodiment 42, cells consistent with cell embodiment 82, or cells consistent with cell embodiments 42 and 82. Similarly, one of ordinary skill in the art will appreciate that the lower level of cells 40 could be assembled of cells consistent with cell embodiment 64, cells consistent with cell embodiment 106, or cells consistent with cell embodiments of 64 and 106.

One of ordinary skill in the art will also appreciate that the stormwater management system 30 can be formed such that the intermediate level of cells 38 is omitted. Alternatively, one of ordinary skill in the art will appreciate that the stormwater management system 30 can be formed such that the stormwater management system includes more than one intermediate level of cells.

Figure 10:
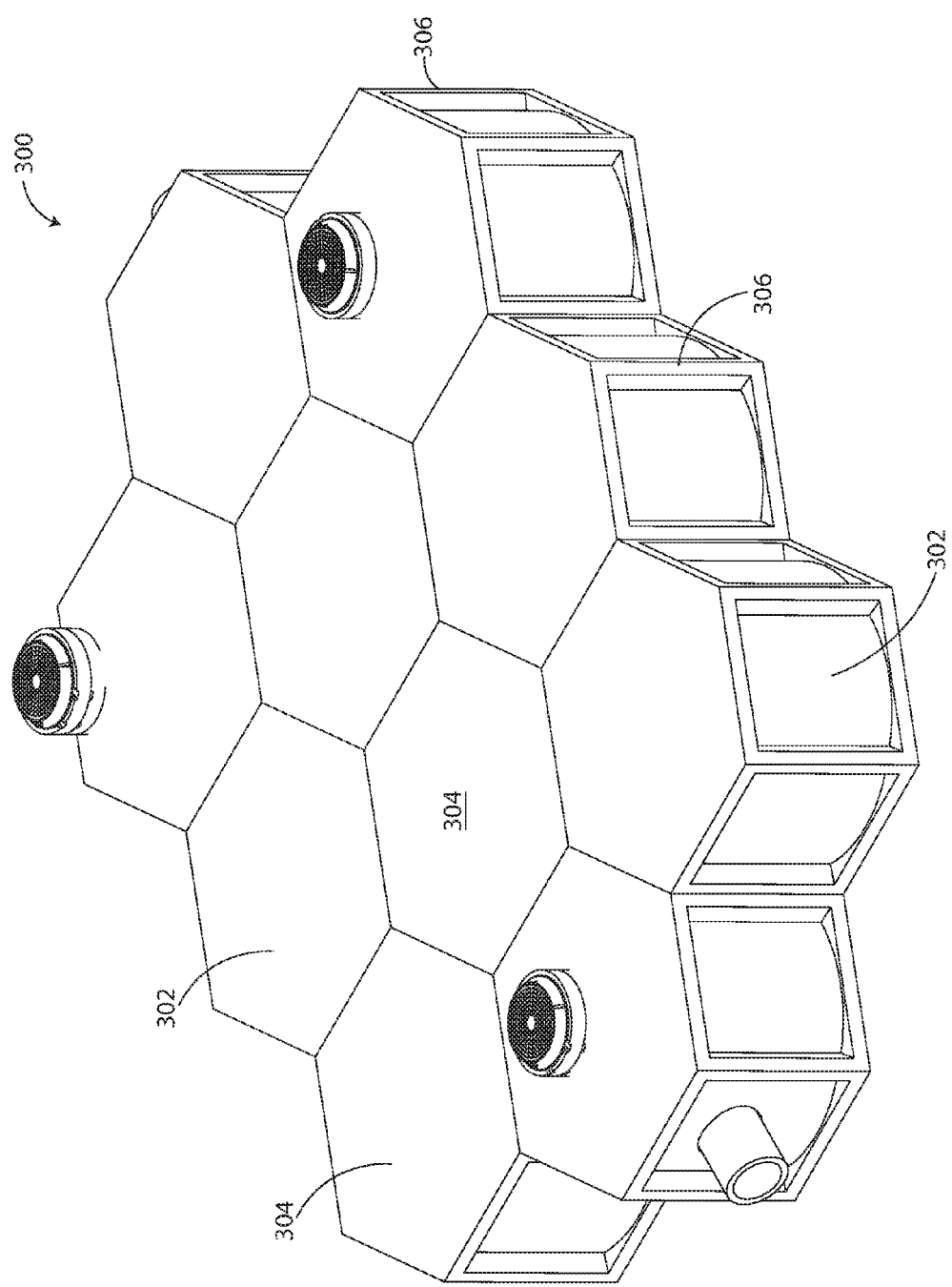
FIG. 10 is a perspective view of another embodiment of a stormwater management system of the present invention.
Figure 11:
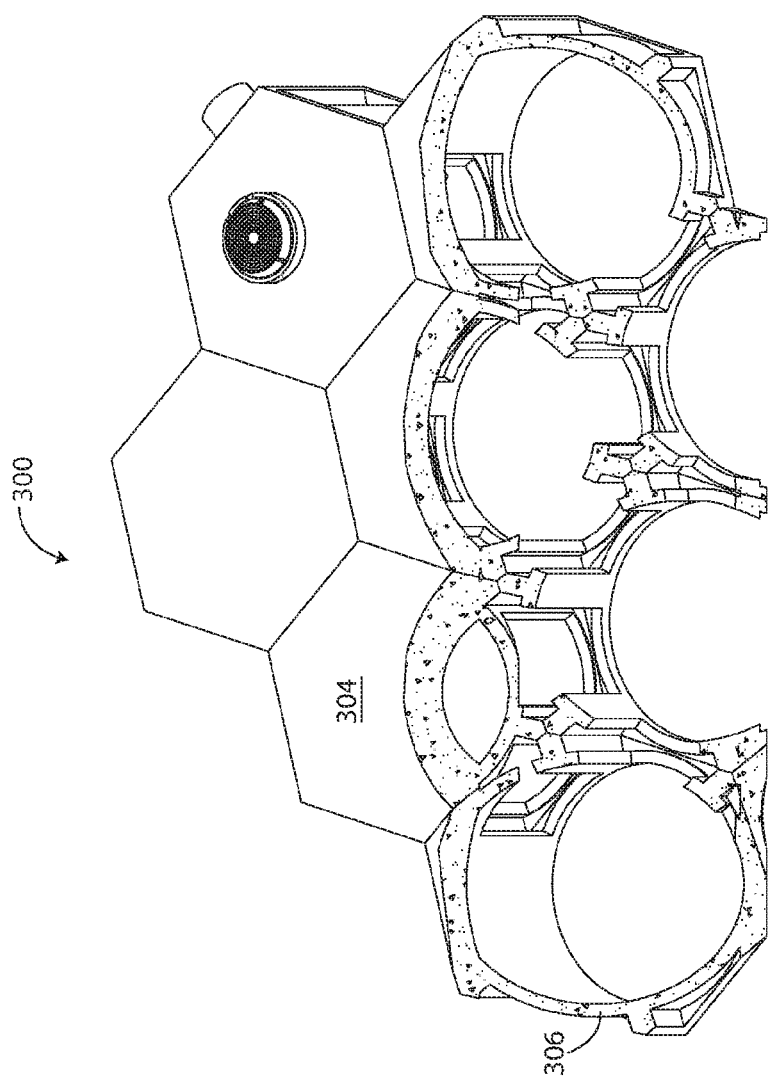
FIG. 11 is a perspective view of the stormwater management system of FIG. 10 with portions broken away to show detail.

Another embodiment of a stormwater management system is shown in FIGS. 10 and 11 and indicated generally by reference numeral 300. The underground system 300 is similar to the stormwater management system 30, except that it comprises only a single level of cells 302 wherein each cell is generally level with each other cell. Although FIGS. 10-11 depicts each of the plurality of cells 302 within the stormwater management system 300 as having a substantially flat top portion 304, one of ordinary skill in the art will understand that the top portion of each of the plurality of cells could be domed. Moreover, as shown in FIG. 11, each of the plurality of cells 302 comprises only a top portion 304 and a body portion 306. Notably, each of the plurality of cells does not comprise a bottom portion. One of ordinary skill in the art, however, will understand that all or some of the plurality of cells 302 could comprise a bottom portion. One of ordinary skill in the art will also understand that if all or some the plurality of cells 302 contain a bottom portion, the bottom portion may have an opening to enable stormwater to pass therethrough.

Figure 12:
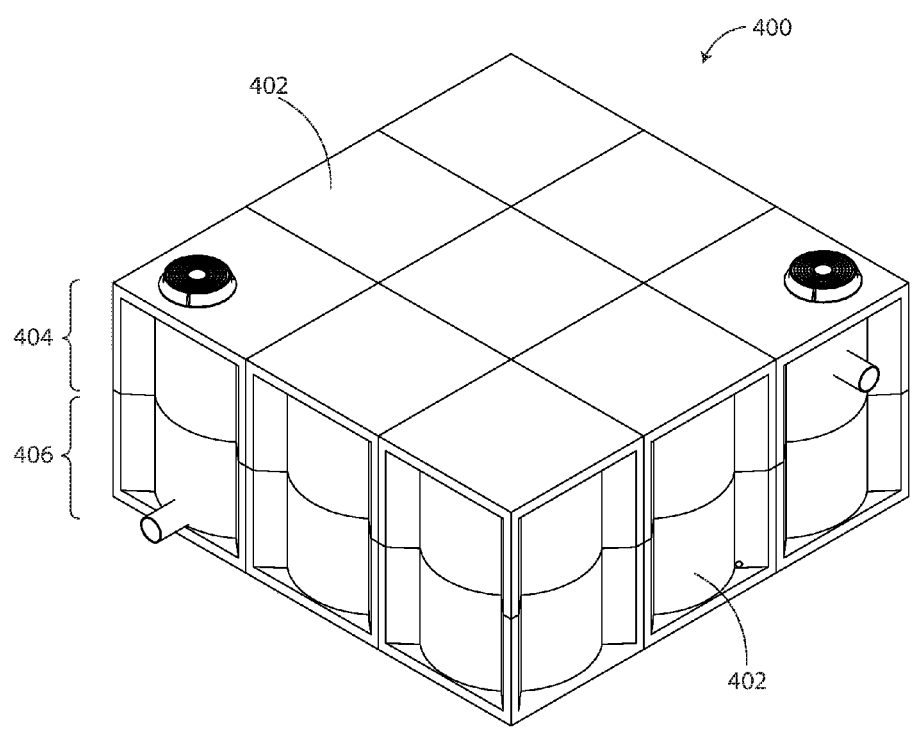
FIG. 12 is a perspective view of another embodiment of a stormwater management system of the present invention, the stormwater management system having an upper level of cells and a lower level of cells.
Figure 13:
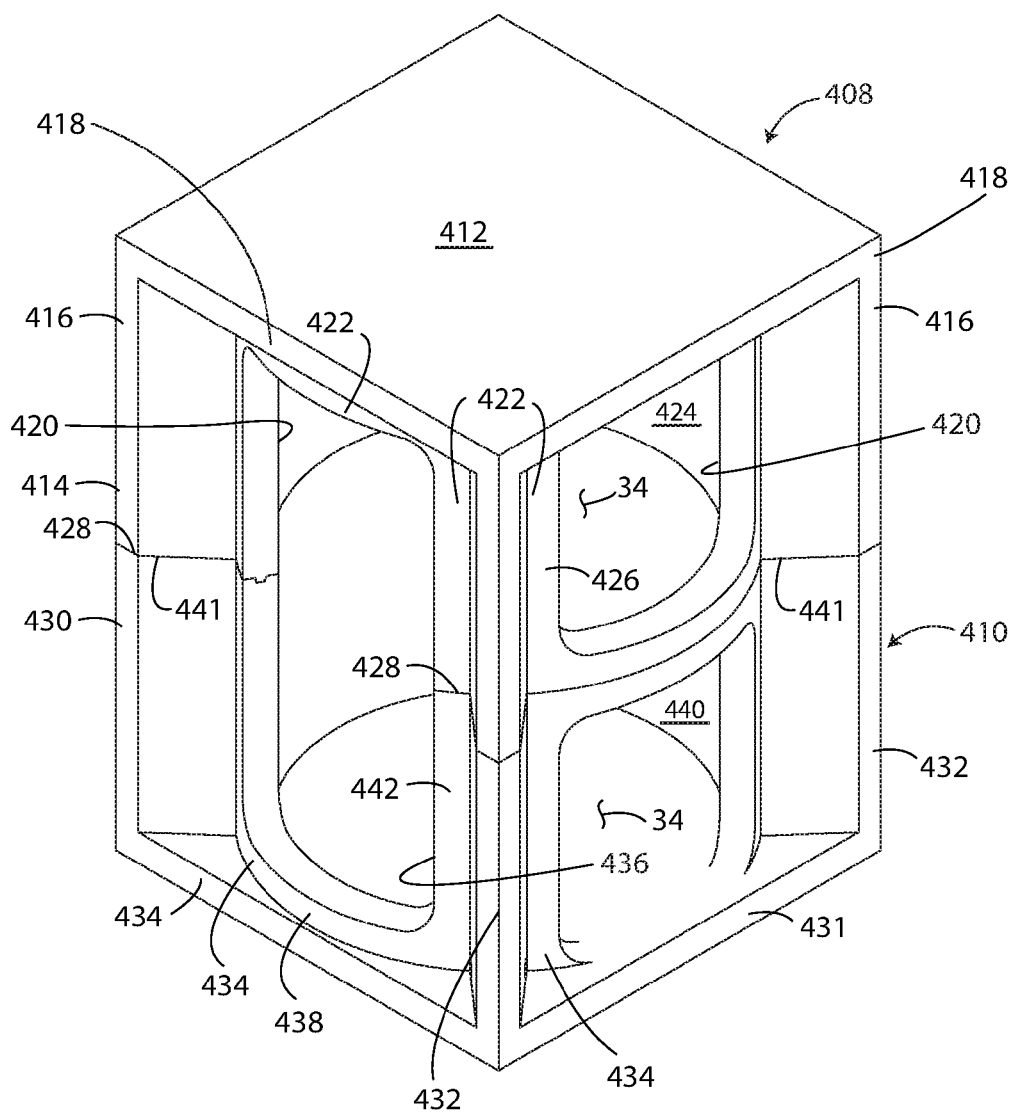
FIG. 13 is a perspective view of a cell of the upper level of cells and a cell of the lower level of cells of the stormwater management system of FIG. 12.

Another embodiment of a stormwater management system is shown in FIGS. 12 and 13 and indicated generally by reference numeral 400. The underground system 400 is similar to the stormwater management system 30. The underground system 400 comprises a plurality of cells 402. The plurality of cells 402 comprises an upper level of cells 704 and a lower level of cells 708. The upper level of cells 704 is in fluid communication with the lower level of cells 708.

An exemplary cell 408 located within the upper level of cells 704 is shown in FIG. 13. Cell 408 comprises a top portion 412 and body portion 414. The body portion 414 comprises four corner columns 416 spaced from each other, four sides 418, and a plurality of windows 420. Each side 418 comprises a wall portion 422. Each wall portion 422 comprises an inner surface 424 and an outer surface 426. The inner surface 424 and the outer surface 426 of each wall portion 422 is curved. More specifically, the inner surface 424 and the outer surface 426 of each wall portion 422 is arcuate. The inner surfaces 424 of the plurality of wall portions 422 collectively constitute an interior surface. The interior surface is of a shape that is generally a right circular cylinder. The interior surface at least partially surrounds the internal region 34 of cell 408. The body portion further comprises a bottom edge 428. Each window 420 is in a different one of the four sides 418 and through a wall portion 422. Each window 420 is spaced from the top portion 412. As seen in FIG. 13, each window may, but is not required to be, spaced from the bottom edge 428 as well.

An exemplary cell 410 located within the lower level of cells 708 is also shown in FIG. 13. Cell 410 comprises a body portion 430 and a bottom portion 431. The body portion 430 comprises four corner columns 432 spaced from each other, four sides 434, and a plurality of windows 436. Each side 434 comprises a wall portion 438. Each wall portion 438 comprises an inner surface 440 and an outer surface 442. The inner surface 440 and the outer surface 442 of each wall portion 438 is curved. More specifically, the inner surface 440 and the outer surface 442 of each wall portion 438 is arcuate. The inner surfaces 440 of the plurality of wall portions 438 collectively constitute an interior surface. The interior surface is of a shape that is generally a right circular cylinder. The interior surface at least partially surrounds the internal region 34 of cell 410. The body portion further comprises a top edge 441. Each window 436 is in a different one of the four sides 434 and through a wall portion 438. Each window 436 is spaced from the bottom portion 431. As seen in FIG. 13, each window 436 may, but is not required to be, spaced from the top edge 441 as well.

Figure 14A:
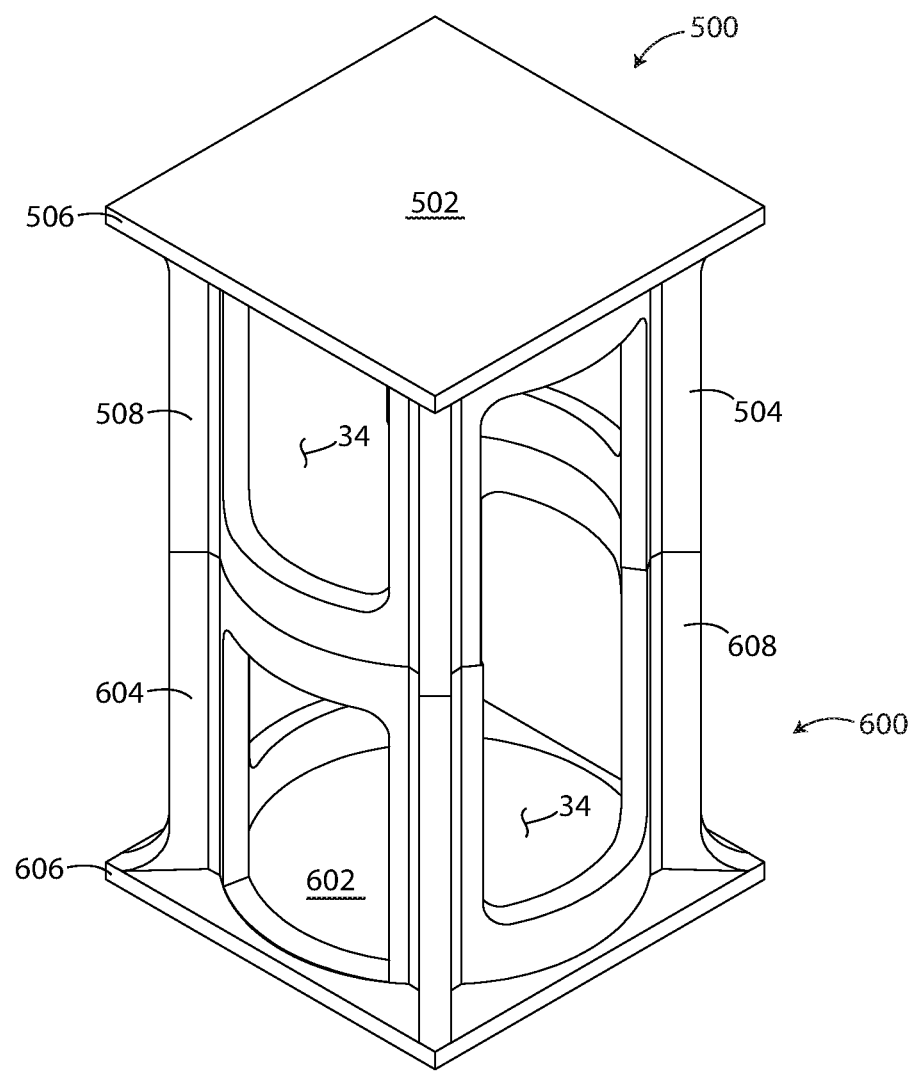
FIG. 14a is a perspective view of an alternative embodiment of a cell of the upper level of cells and an alternative embodiment of a cell of the lower level of cells of the stormwater management system of FIG. 12.
Figure 14B:
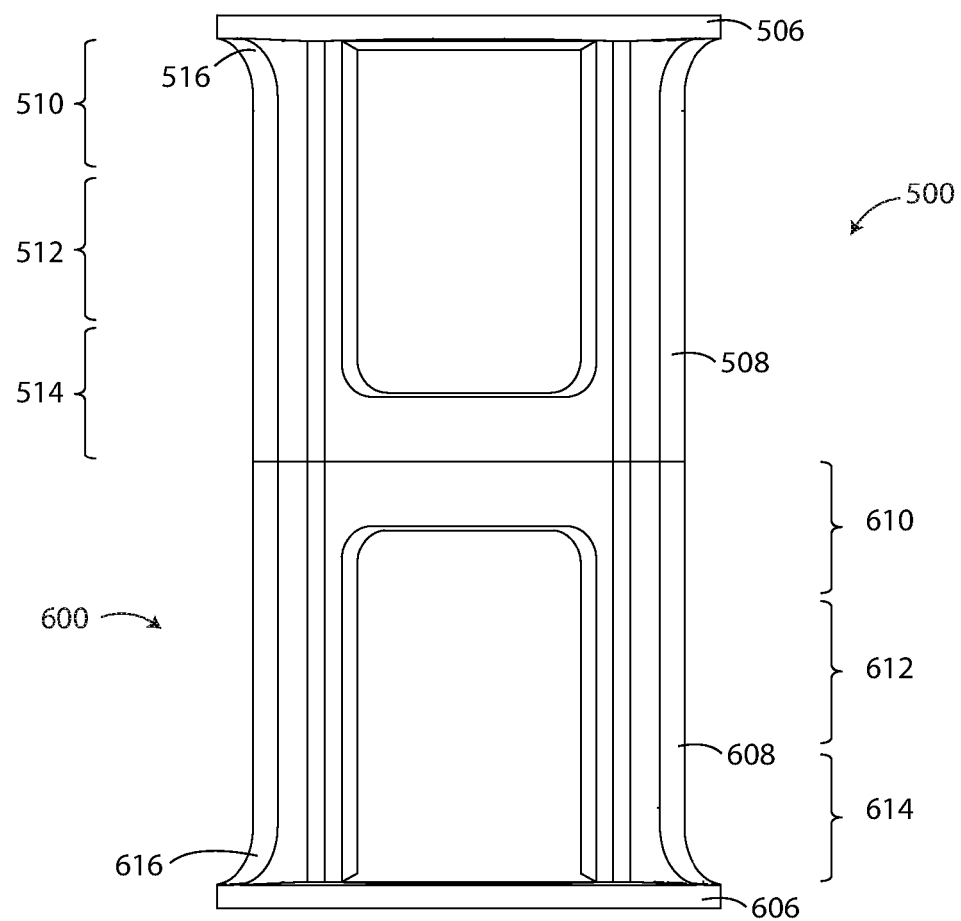

Another embodiment of a cell 500 capable of being located within the upper level of cells 704 is shown in FIGS. 14a and 14b. Cell 500 is similar to cell 408. Cell 500 comprises a top portion 502 and a body portion 504. The top portion 502 has an outermost edge surface 506. The body portion 504 comprises four corner columns 508 spaced from each other. Each corner column 508 comprises a top region 510, a bottom region 512, and an intermediate region 514. The intermediate region 514 extends from the top region 510 to the bottom region 512. Each corner column 508 of cell 500 is shaped such that the bottom region 512 and the intermediate region 514 of each corner column are spaced inwardly from the outermost edge surface 506 of the top portion 502. The top region 510 of each corner column 508 is curved or shaped such that a portion of the top region (e.g., tapered portion 516) extends to the outermost edge surface 506. Because the bottom region 512 and the intermediate region 514 of each corner column 508 are spaced inwardly from the outermost edge surface 506 of the top portion 502, stormwater is capable of flowing around each of the corner columns to an adjacent cell without passing through the internal region 34 of cell 500. It is to be understood that in an alternative embodiment of cell 500, the bottom region 512 and the intermediate region 514 of less than all of the corner columns 508 could be spaced inwardly from the outermost edge surface 506 such that stormwater is capable of flowing around some (but not all) of the corner columns 508 without passing through the internal region 34 of the cell. It is also to be understood that in an alternative embodiment of cell 500, the top region 510, the bottom region 512, and the intermediate region 514 of each (or some) of the corner columns 508 could be spaced inwardly from the outermost edge surface 506 of the top portion 502.

Another embodiment of a cell 600 capable of being located within the lower level of cells 708 is also shown in FIGS. 14a and 14b. Cell 600 is similar to cell 410. Cell 600 comprises a bottom portion 602 and a body portion 604. The bottom portion 602 has an outermost edge surface 606. The body portion 604 comprises four corner columns 608 spaced from each other. Each corner column 608 comprises a top region 610, a bottom region 612, and an intermediate region 614. The intermediate region 614 extends from the top region 610 to the bottom region 612. Each corner column 608 of cell 600 is shaped such that top region 610 and the intermediate region 614 of each corner column is spaced inwardly from the outermost edge surface 606 of the bottom portion 602. The bottom region 612 of each corner column 608 is curved or otherwise shaped such that a portion of the bottom region (e.g., tapered portion 616) extends to the outermost edge surface 606. Because the top region 610 and the intermediate region 614 of each corner column 608 are spaced inwardly from the outermost edge surface 606 of the bottom portion 602, stormwater is capable of flowing around each of the corner columns to an adjacent cell without passing through the internal region 34 of cell 600. Depending upon the arrangement of the cells and the types of cells used within a lower level of a stormwater management system, the capability of stormwater to flow around some or all of the corner columns of a cell without passing through an internal region of said cell could prevent a damming or pooling effect in the stormwater management system. It is to be understood that in an alternative embodiment of cell 600, the top region 610 and the intermediate region 614 of less than all of the corner columns 608 could be spaced inwardly from the outermost edge surface 606 such that stormwater is capable of flowing around some of the corner columns without passing through the internal region 34 of the cell. It is also to be understood that in an alternative embodiment of cell 600, the top region 610, the bottom region 612, and the intermediate region 614 of each (or some) of the corner columns 508 could be spaced inwardly from the outermost edge surface 606 of the bottom portion 602.

Although depicted as having two levels off cells 402, it should be understood that stormwater management system 400 can have a single level of cells 402 in some embodiments. In such cases, cells 402 may include a top and/or bottom portion. In these embodiments, stormwater management system 400 is similar to the stormwater management system 300 depicted in FIGS. 10-11.

Figure 15:
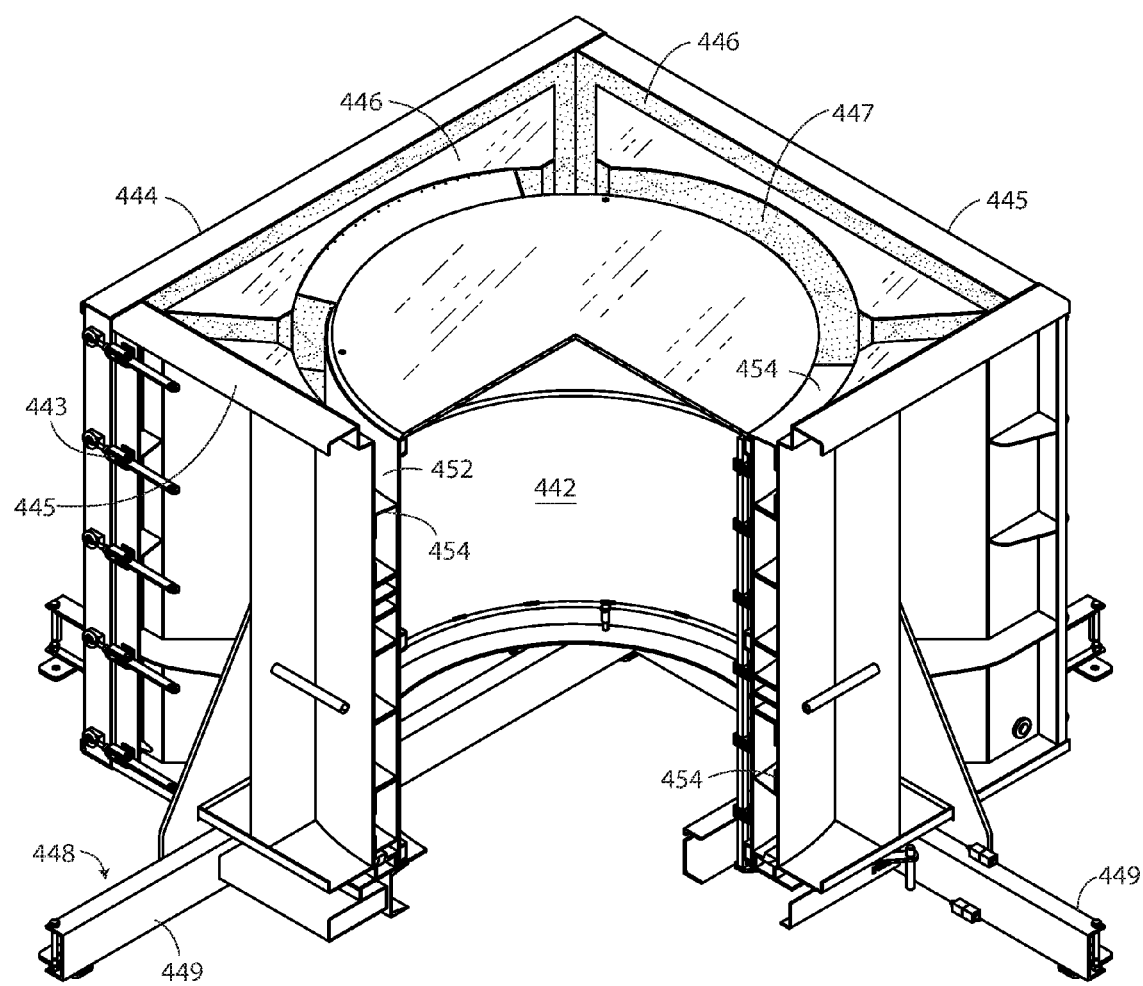
FIG. 15 is a perspective view of inner and outer mold components with portions broken away to show detail.
Figure 16:
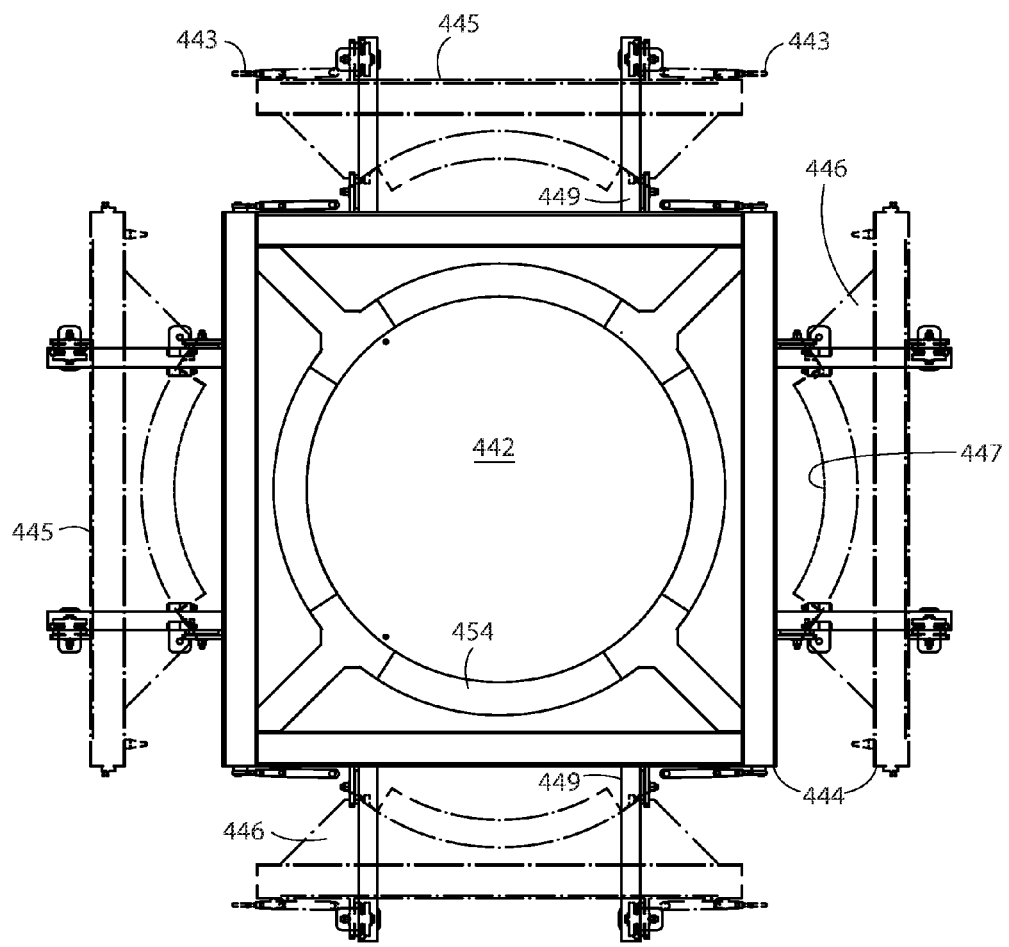
FIG. 16 is a top plan view of the inner and outer mold components of FIG. 15, walls of the outer mold component being shown in a latched configuration in solid lines and an unlatched configuration in dashed lines.

A method of manufacturing a stormwater management module comprises positioning an inner mold component 442 and an outer mold component 444 relative to each other such that the inner mold component is within the outer mold component. As seen in FIGS. 15 and 16, the outer mold component 444 comprises at three mold surfaces 446. Depending upon the module being manufactured and the module's intended shape, the outer mold component 444 can comprise either more or fewer mold surfaces. In FIGS. 15 and 16, the outer mold component 444 comprises a plurality of walls 445, each wall comprising a plurality of mold surfaces 446. The walls 445 are capable of being connected to each other via a plurality of latches 443. FIG. 16 shows the walls 445 in a latched configuration in sold lines. The plurality of mold surfaces 446 collectively constitute an interior surface. Preferably, each of the mold surfaces 446 comprises a rounded portion 447. The inner mold component 442 comprises a round exterior surface 452. The interior surface of the outer mold component 444 and the round exterior surface 452 collectively define an internal region capable of receiving liquid concrete. Preferably, the inner mold component 442 and/or the outer mold component 444 comprises a plurality of blockouts 454 (e.g. protruding pieces of sheet metal extending away from a surface) capable of being adjusted. More specifically, preferably the interior surface of the outer mold component 444 and/or the round exterior surface 452 of the inner mold component 442 comprises a plurality of blockouts 454 capable of being adjusted. When the inner mold component 442 is located within the outer mold component 444, the plurality of blockouts 454 define at least one blockout region that does not receive liquid concrete during the manufacturing process of a stormwater module, thereby forming windows in the stormwater module.

After the inner mold component 442 is located within the outer mold component 444, liquid concrete is poured between the interior surface of the outer mold component and the exterior surface 452 of the inner mold component so as to at least partially fill the internal region. The liquid concrete is allowed to cure to form the stormwater management module. After the liquid concrete cures, the stormwater management module is separated from the inner and outer mold components 442, 444. To separate the outer mold component 444 from the module, the walls 445 of the outer mold component are unlatched from each other. FIG. 15 shows the walls 445 in an unlatched configuration in dashed lines. Preferably, the outer mold component 444 further comprises a track system 448 comprising a plurality of rails 449. The track system 448 is adapted such that the walls 445 are capable of being slid away from each other along the rails 449. FIG. 15 shows the walls 445 of the outer mold component 444 slid away from each other via the track system 448 in dashed lines. To separate the inner mold component from 442 from the module, the inner mold component is collapsed along a seam (not shown), reducing the width of the inner mold component and enabling the inner mold component to be removed from the module.

Figure 17:
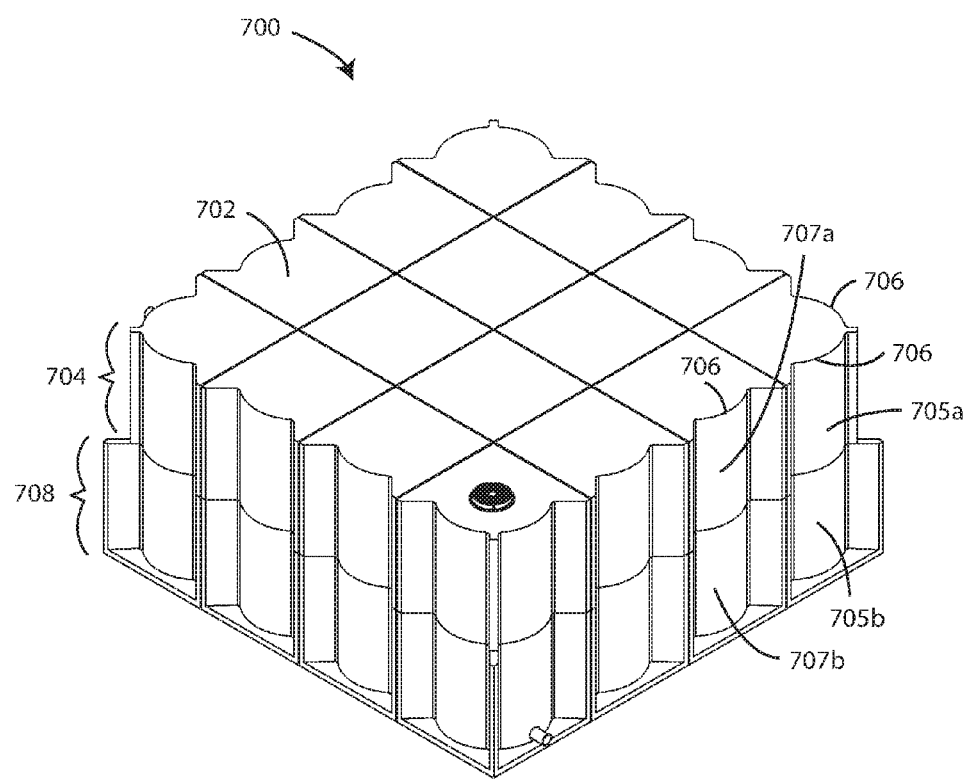
FIG. 17 is a prospective view of an alternative embodiment of a stormwater management system.
Figure 18:
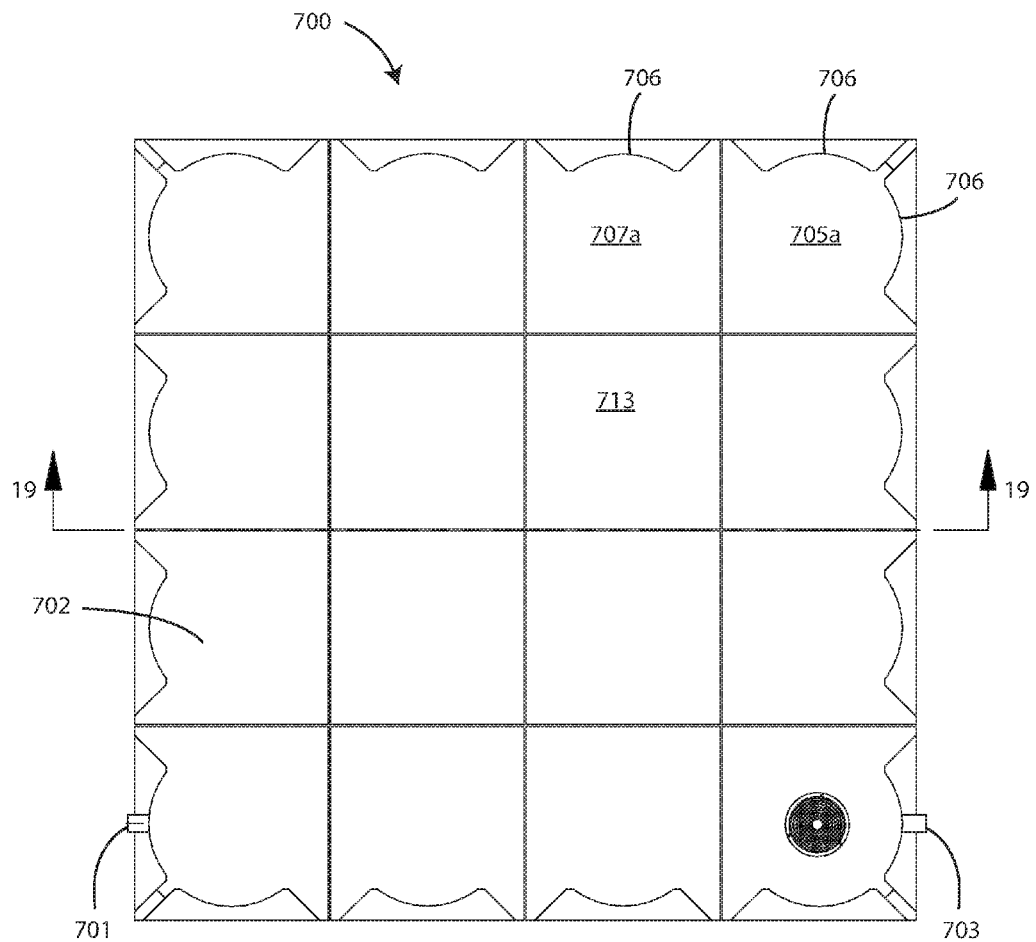
FIG. 18 is a top plan view of the stormwater management system of FIG. 17.
Figure 19:
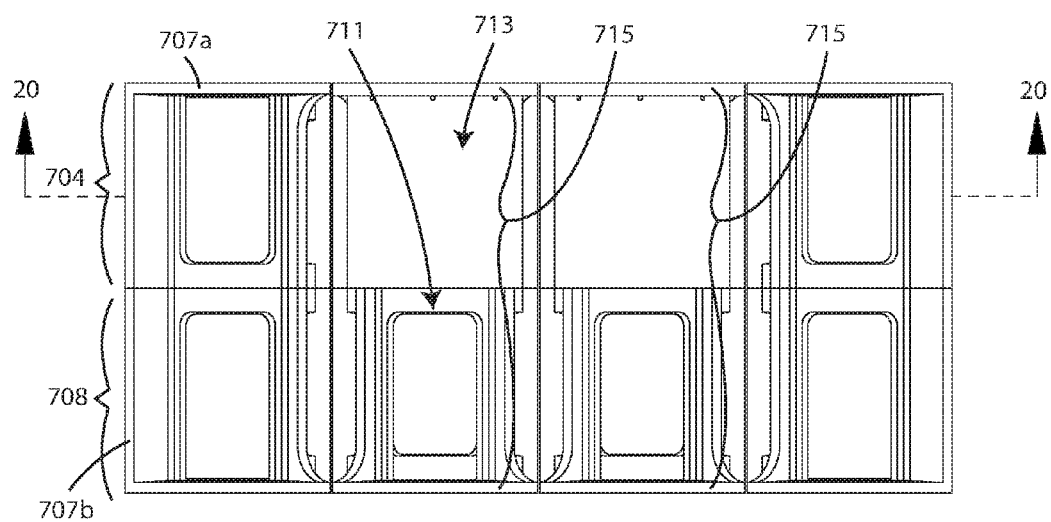
FIG. 19 is a cross-sectional view taken along the plane of line 19-19 of FIG. 18.

Another embodiment of a stormwater management system is shown in FIGS. 17 and 18 and indicated generally by reference numeral 700. FIG. 17 illustrates a perspective view of stormwater management system 700, and FIG. 18 illustrates a top view of stormwater management system 700. The stormwater management system 700 is similar to the stormwater management system 30 and the underground system 400 previously described. Stormwater management system 700 includes a plurality of cells 702. Referring to FIGS. 17-19, cells 702 include corner cells 705a of upper level 704, corner cells 705b of lower level 708, side cells 707a of upper level 704, side cells 707b of lower level 708, interior cells 713 of upper level 704, and interior cells 711 of lower level 708. Generally, cells 702, with the exception of interior cell 713, are similar to cell 500 and cell 600 described above with reference to FIGS. 14a and 14b and differ to the extent described herein.

Figure 21:
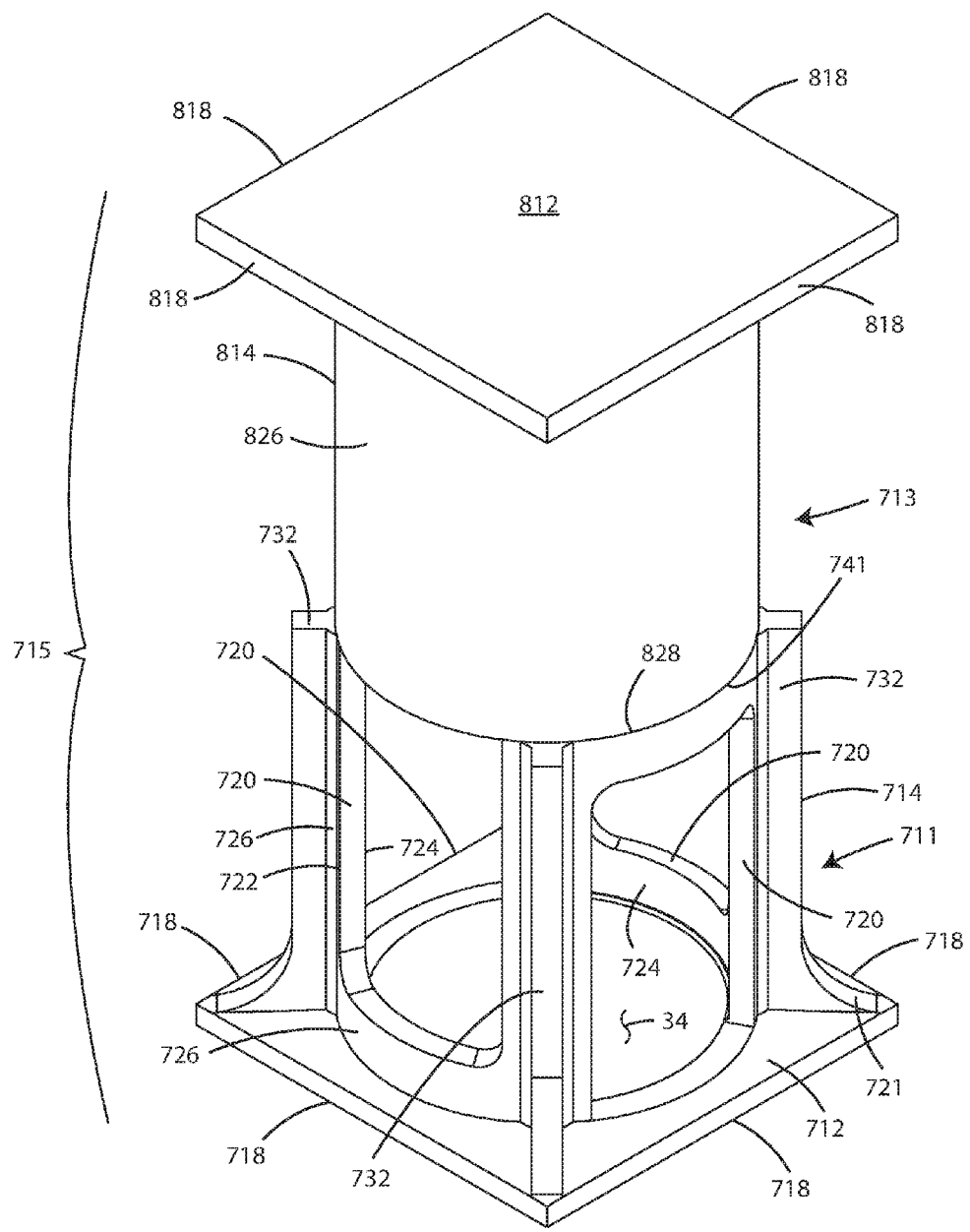
FIG. 21 is a perspective view of a stacked pair of cells of the stormwater management system of FIG. 17.

Interior cell 711 of lower level 708 is similar to cell 600 and differs to the extent described herein. Corner cell 705b and side cell 707b, both of lower level 708, are similar to lower cell 600 but differ in the number of windows therein and otherwise differ as described herein. Referring to FIG. 21, corner cell 705b includes two windows rather than four and side cell 707b includes three windows rather than four. Both corner cell 705b and side cell 707b also differ from cell 600 in that their columns adjacent the periphery of stormwater management system 700 extend to outer edge of the bottom portion throughout rather than including a tapered portion 616 as in cell 600. Corner cell 705a and side cell 707a, both of upper level 704, are similar to upper cell 500 previously described but differ in the number of windows therein and otherwise differ as described herein. As described in greater detail with reference to FIG. 21, corner cell 705a includes two windows rather than four and side cell 707a includes three windows rather than four. Corner cell 705a also includes a column on the periphery of stormwater management system 700 that does not include the tapered portion 516 of cell 500. Furthermore, both corner cell 705a and side cell 707a include scalloped top portions 706.

The plurality of cells 702 are arranged in the upper level 704 and the lower level 708. Each cell 702 of upper level 704 is in fluid communication with at least one cell 702 of lower level 708. The cells 702 of lower level 708 have internal regions in fluid communication with one another to allow stormwater to flow from the internal region of one of the cells 702 to the internal region of adjacent cells 702. The corner and side cells 702 of upper level 704 have internal regions in fluid communication with one another to allow stormwater to flow from the internal region of one of the cells 702 of lower level 708 to the internal region of another of the cells 702 of the lower level 708. In an alternative embodiment, each cell 702 of the upper level 704 is in sufficient fluid communication only with the cell 702 of the lower level 708 upon which it is stacked to permit stormwater to flow between the internal region of the cell 702 of the upper level 704 and the cell 702 of the lower level 708 upon which it is stacked. In other words, in such an alternative embodiment, stormwater can rapidly flow from the internal region of a cell of the lower level upwardly to the internal region of the cell stacked on the cell of the lower level, but stormwater in the internal region of a cell of the upper level cannot rapidly and directly flow to the internal region of an adjacent cell of the upper level.

In alternative embodiments, stormwater management system 700 includes additional levels (not shown). Upper level 704 and/or lower level 708 may be intermediate levels with additional levels above and/or below. Furthermore, in some alternative embodiments, an intermediate level is positioned between upper level 704 and lower level 708. In all embodiments, at least one cell of each level is in fluid communication with at least one other cell of the adjacent levels. This arrangement provides for fluid communication between all adjacent levels.

Corner cells 705a and 705b have two sides that form a portion of the periphery of stormwater management system 700. Side cells 707a and 707b have a single side that forms a portion of the periphery of stormwater management system 700. Each side of each interior cell 711 and 713 is adjacent another cell 702. Corner cells 705a are in fluid communication with adjacent side sells 707a in upper level 704 and corner cells 705b are in fluid communication with adjacent side sells 707b in lower level 708. Side cells 707a are in fluid communication with adjacent side cells 707a and adjacent corner cells 705a in upper level 704. Side cells 707b are in fluid communication with adjacent side cells 707b, adjacent interior cells 711 and adjacent corner cells 705b in lower level 708. In upper level 704, side cells 707a and corner cells 705a are not in fluid communication with interior cells 713. In other words, the body portion of each interior cell 713 is devoid of windows through which stormwater may flow. As explained in greater detail later herein with reference to FIGS. 19 and 21-22, at least one interior cell 713 of upper level 704 is in fluid communication only with an interior cell 711 of lower level 708, the two cells forming a stacked pair. In some embodiments, all interior cells of upper level 704 are configured in this manner to form stacked pairs with corresponding interior cells 711 of lower level 708.

As depicted, stormwater management system 700 is rectangular and includes cells 702 having a square or rectangular cross section. In alternative embodiments, cells 702 have alternative configurations, e.g., are hexagonal, triangular, generally polygonal, ovoid, circular, or the like. Stormwater management system 700 may also have other configurations of tessellated cells 702, e.g., a honeycomb configuration or other configurations that fit together without leaving any spaces. In these alternative embodiments, interior cells 713 and 711 and outer cells, including side cells 707a and 707b and/or corner cells 705a and 705b, are configured to function as described herein with respect to the rectangular cells 702 depicted.

Referring still to FIGS. 17 and 18, stormwater management system 700 includes an inlet 701 and an outlet 703. Stormwater management system 700 receives stormwater through inlet 701 and retains and/or detains the stormwater. Stormwater is discharged from stormwater management system 700 through outlet 703. Inlet 701 is in fluid communication with a cell 702, e.g., a corner cell 705a, of upper level 704. Outlet 703 is in fluid communication with a cell 702, e.g., corner cell 705b, of lower level 708. In alternative embodiments, stormwater management system 700 has alternative configurations for receiving and/or discharging stormwater. For example, stormwater management system 700 may not include one or more of inlet 701 and outlet 703. In such embodiments, stormwater management system 700 is configured to receive and/or discharge stormwater through other openings such as apertures, pores, grated openings, or the like in one or more of top portions of cell(s) 702 in upper level 704 and bottom portions of cell(s) 702 in lower level 708.

Still referring to FIGS. 17 and 18, corner cells 705a and side cells 707a of upper level 704 include scalloped top portions 706. In contrast to a fully rectangular top portion as with interior cells 713, scalloped top portions 706 do not overhang the body portion of the cells 705a and 707a. Rather, scalloped top portions 706 are contoured with the body portion of cells 705a and 707a. Advantageously, the lack of a top portion overhang facilitates backfilling around stormwater management system 700. In some embodiments, scalloped top portions 706 may overhang the body portion of cells 705a and 707a but do not do so to the extent of an un-scalloped top portion, e.g., the top portion of interior cells 713. In embodiments in which corner cells 705b and side cells 707b of lower level 708 include a top portion, the top portion is scalloped as described with respect to the scalloped top portions 706 of cells 705a and 707a. Furthermore, in embodiments in which corner cells 705a and side cells 707b of upper level 704 include a bottom portion, the bottom portion is scalloped.

As shown in FIG. 19, stormwater management system 700 includes stacked pairs 715 of cells 702. Each stacked pair 715 includes a first cell 711 of lower level 708 and a second interior cell 713 of upper level 704. Also for each stacked pair 715, first cell 711 and second cell 713 are shaped and arranged such that an internal region of first cell 711 and an internal region of second cell 713 are in fluid communication. This fluid communication permits stormwater to flow from the internal region of first cell 711 to the internal region of second cell 713. For example, stormwater enters stormwater management system 700 and flows between the internal regions of one, two, or more cells 702, e.g., an interior cell other than cell 713, side cells 707a and/or corner cells 705a, of upper level 704. Stormwater then flows from one or more cells 702 of upper level 704 downward into one or more cells of lower level 708, e.g., interior cells 711, side cells 707b and/or corner cells 705b. Stormwater flows into the internal region of at least one first cell 711, e.g., from one or more side cells 707b in lower level 708. As the level of stormwater in first cell 711 exceeds the height of the internal region, stormwater flows upward into the internal region of second cell 713. Second cell 713 is windowless, thereby allowing second cell 713 to retain, detain, store, or otherwise contain stormwater. As stormwater exits stormwater management system 700, the level of stormwater within second cell 713 lowers as stormwater flows from second cell 713 into first cell 711.

Side cells 707a and corner cells 705 of upper level 704 are generally not in fluid communication with cells 702 of lower level 708. Although, at least one side cell 707a or one corner cell 705a is in fluid communication with a cell 702 of lower level 708, e.g., side cell 707b or corner cell 705b. The majority of side cells 707a and corner cells 705a of upper level 704 include solid bottom portions and are not in fluid communication with cells 702 of lower level 708. These solid portions may be scalloped as previously described herein. In further alternative embodiments, only a single corner cell 705a or a single side cell 707a of upper level 704 is in fluid communication with a cell 702 of lower level 708, e.g., a single corner cell 705b or a single side cell 707b. In still further embodiments, an internal cell of upper level 704 is in fluid communication with a first cell 711 of lower level 708, but the two cells do not form a stacked pair of the type described with reference to FIGS. 21-25, e.g., the interior cell of upper level 704 includes a window or other inlet. In some alternative embodiments, upper level 704 includes interior cells of the type described herein with reference numeral 711. For example, upper level 704 may include cells 702 with one or more windows and that are in fluid communication with adjacent cells in upper level 704. Such cells may or may not be in fluid communication with internal cells 711 of lower level 708, e.g., they may have a solid bottom portion.

Figure 20:
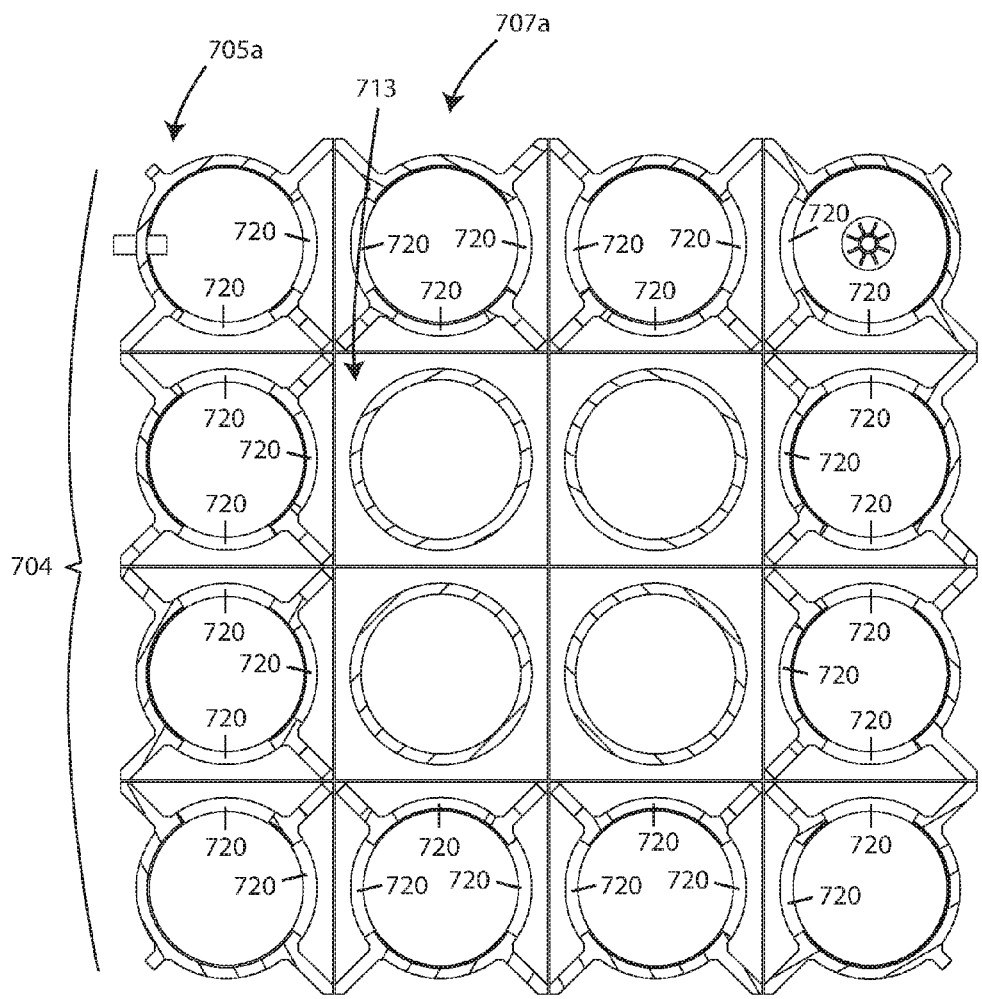
FIG. 20 is a cross-sectional view taken along the plane of line 20-20 of FIG. 19.

Referring now to FIG. 20, upper level 704 includes corner cells 705a, side cells 707a, and second cells 713. Corner cells 705a include two windows 720 shaped and adapted to permit flow of stormwater between interior regions of corner cell 705a and adjacent cells 702 within upper level 704, i.e., side cells 707a. Side cells 707a of upper level 704 include at least two windows 720 shaped and adapted to permit stormwater to flow between interior regions of side cell 707a and adjacent side cells 707a and adjacent corner cells 705a. Stormwater does not flow directly between side cells 707a and second cells 713. In some embodiments, side cells 707a of upper level 704 include a third window 720 oriented towards a second cell 713, but no stormwater passes between the two as second cell 713 is windowless. Such a configuration of side cell 707a allows the cell to be used in either upper level 704 or lower level 708 without modification or without substantial modification, e.g., a change in the number of windows. The windowless body portion of second cell 713 contains stormwater received into the interior portion of second cell 713 from first cell 711 (shown in FIG. 19) of lower level 708. One or more cells 702 of upper level 704 may include openings such an access manhole or the like.

All interior cells of upper level 704 are second cells 713. In alternative embodiments, upper level 704 includes at least one second cell 713 but can include other types of interior cells. For example, some of the interior cells 709 may be adapted and shaped to allow for fluid communication with side cells 707a of upper level 704. Such an interior cell includes at least one window 720 and may be similar to cell 711 of lower level 708.

Figure 22:
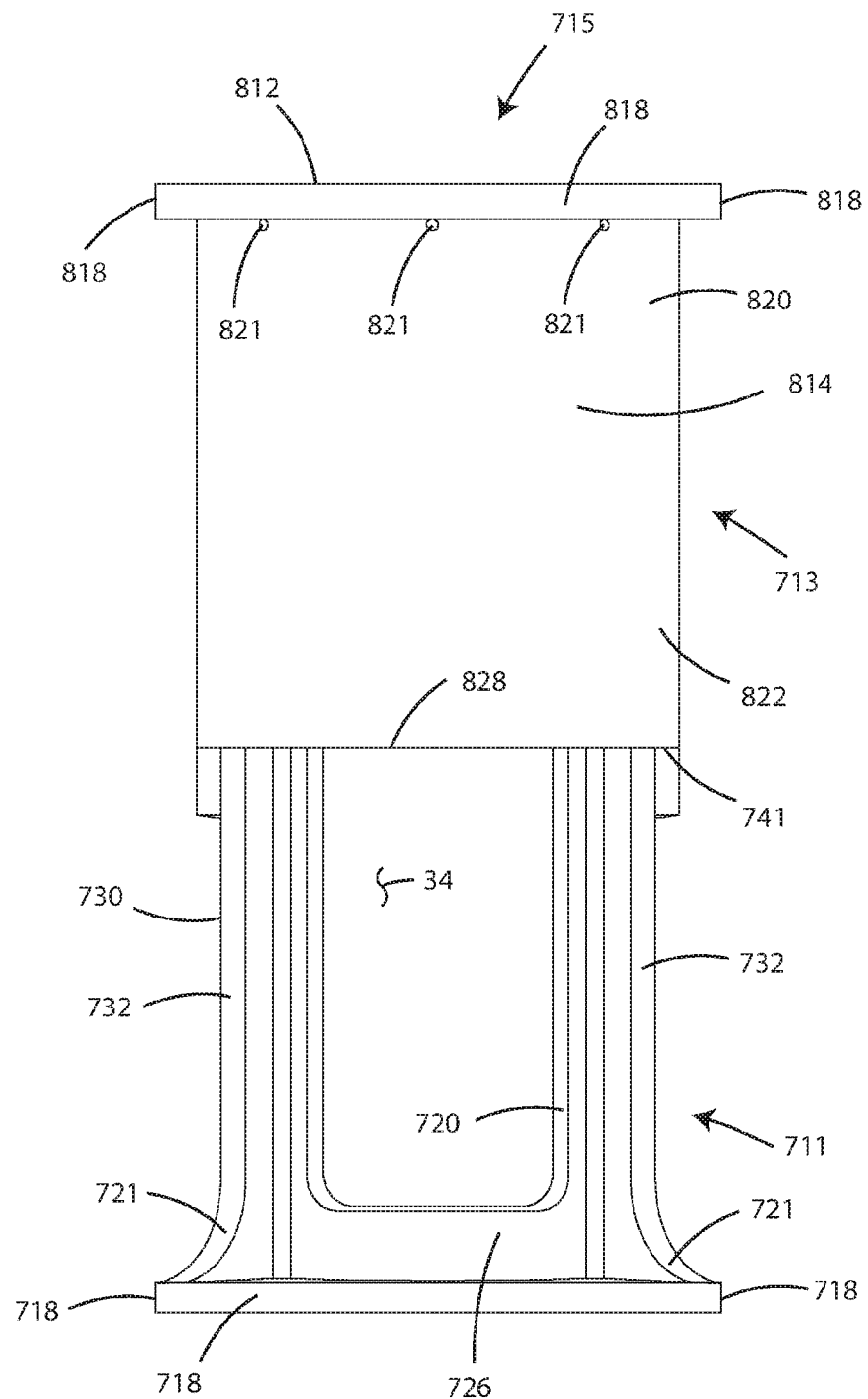
FIG. 22 is a side elevation view of the stacked pair of cells of FIG. 21.

FIGS. 21 and 22 illustrate a stacked pair 715 of first cell 711 and second cell 713 according to one embodiment. First cell 711 includes a body portion 714, four side portions 718, and a bottom portion 712. The body portion 714 includes four corner columns 732 spaced from each other and a plurality of windows 720. Each side 718 includes a wall portion 722. Each wall portion 722 comprises an inner surface 724 and an outer surface 726. The inner surface 724 and the outer surface 726 of each wall portion is a closed curve in horizontal cross-section. More specifically, the inner surface 724 and the outer surface 726 of each wall portion is circular in horizontal cross-section. The inner surfaces 724 of the plurality of wall portions collectively constitute an interior surface. The interior surface, or at least a majority thereof, is of a shape that is generally a right cylinder. More preferably, the interior surface, or at least a majority thereof, is a right circular cylinder, but the interior surface may alternatively be of other right cylinders (e.g., right square cylinders, right rectangular cylinders, right elliptical cylinders, etc.). The interior surface at least partially surrounds the internal region 34 of first cell 711. Each window 720 is in a different one of the four sides 718 and through a wall portion.

Body portion 714 further includes a top edge 741. Some windows 720 are spaced from bottom portion 712 and some windows 720 terminate at bottom portion 712. In alternative embodiments, all windows either terminate at bottom portion 712 or are spaced from bottom portion 712. Some windows 720 are spaced from top edge 741 and some windows 720 terminate at top edge 741. In alternative embodiments, all windows either terminate at top edge 741 or are spaced top edge 741.

Each corner column 732 terminates at bottom portion 712. Bottom portion 712 includes a plurality sides 718. Bottom portion 712 further defines the bottom of internal region 34. Each corner column 732 further terminates at top edge 741.

Each corner column 732 is shaped such that the majority of each corner column 732 is spaced inwardly from the outermost edge surface 718 of bottom portion 712. A bottom region 721 of each corner column 732 is curved or shaped such that a portion of the bottom region 721 extends to the outermost edge surface 718. Because the majority of each corner column 732 is spaced inwardly from the outermost edge surface 718 of bottom portion 712, stormwater is capable of flowing around each of the corner columns 732 to an adjacent cell 702 without passing through the internal region 34. In alternative embodiments a subset of corner columns 732 are shaped and configured in this way, while the other corner columns extend to the outermost edge surface 718 throughout. In further alternative embodiments, all corner columns 732 extend to the outermost edge surface 718 throughout such that stormwater can only move between cells 702 through internal regions 34.

In some alternative embodiments, first cell 711 includes a top portion similar to bottom portion 712. Such a top portion includes an opening, aperture, or the like to allow for fluid communication between the internal regions 34 of first cell 711 and second cell 713.

Corner cells 705b and side cells 707b of lower level 708 and corner cells 705a and side cells 707a of upper level 704 include the same features as first cell 711 described above. Corner cells 705a and 705b differ from first cell 711 in at least that corner cells 705a and 705b include only two windows 720 in adjacent sides 718. The wall portions 722 of other sides 718 do not include windows 720. Side cells 707a and 707b differ from first cell 711 in at least that side cells 707a and 707b include only three windows 720 in consecutive sides 718. In some alternative embodiments, side cell 707a includes only two windows 720 in opposite sides 718. The remaining sides 718 have wall portions 722 and do not include windows 720. Side cells 707a and corner cells 705a of upper level 704 may also include scalloped portions in bottom portion 712 as previously described with reference to FIGS. 17 and 18.

Advantageously, the configuration of the cells 702 described herein allows for cells 702 to be used in either lower level 708 or upper level 704 without modification or without significant modification, e.g., bottom portion 712 may be modified to form scalloped portions. Cells 702 can be rotated or flipped to be used in either level or stacked upon a base, e.g., a concrete pad, to form multiple levels using the same or substantially the same cells 702. A bottom portion 712 can be adapted function as a top portion by rotating or flipping the cell 702.

Figure 23:
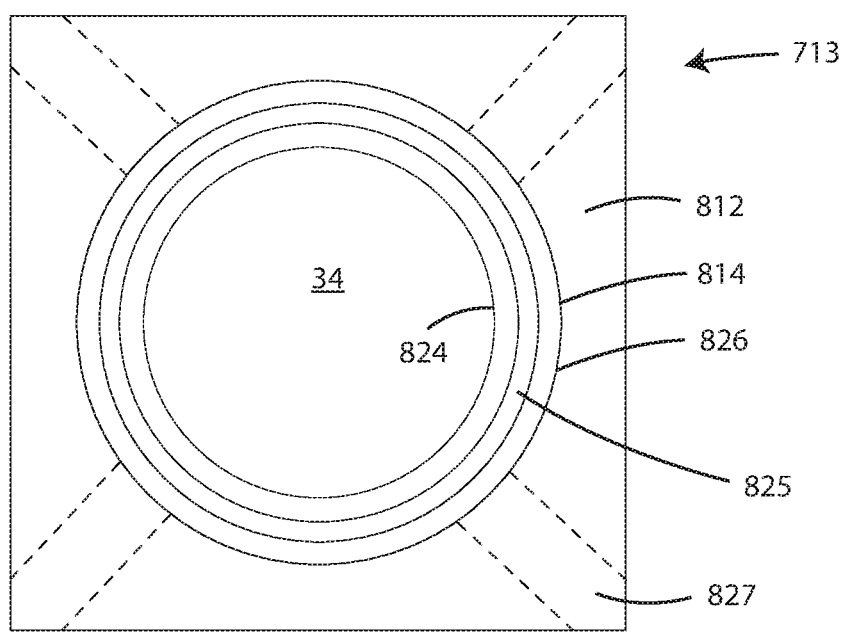
FIG. 23 is a bottom view of a second cell of the stacked pair of cells of FIG. 21.

Referring to FIGS. 21-23, second cell 713 includes a body portion 814, four side portions 818, and a top 812. Body portion 814 is substantially cylindrical in shape, e.g., is a right circular cylinder, notched right circular cylinder, or the like, and defines an interior region 34 of a right circular shape. Outer surface 826 of body portion 814 is curved. Inner surface 824 is also curved. Body portion 814 is windowless, i.e., none of sides 818 include a window 720. Body portion 814 terminates at bottom edge 828 and forms an opening into internal region 34. Body portion 814 also terminates at top 812. Top 812 seals one end of body portion 814 and defines, in part, internal region 34. Top 812 has the same cross section as lower portion 712 of first cell 711. Optionally, top 812 may include one or more beams 827 (shown in dashed lines). Beams 827 support top 812, but may be omitted in some embodiments to reduce the amount of material used in manufacturing second cell 713.

Body portion 814 includes a plurality of vents 821. Each vent 821 is an opening within body portion 814 that extends through body portion 814 such that a gas, e.g., air, is permitted to pass between internal region 34 and the exterior of second cell 713. This allows second cell 713 to vent air within internal region 34 of second cell 713 to the exterior as second cell 713 fills with stormwater through first cell 711. In some embodiments, second cell 713 includes eight vents 821, e.g., with each vent 821 positioned around body portion 814 and separated by forty five degrees. Vents 821 are located in a top portion 820 of body portion 814. Top portion 820 extends from a first end defined by top 812 towards the opening defined by body portion 814 opposite top 812. Top portion 820 extends towards a lower body portion 822 of body portion 814. Lower body portion 822 extends from the opening opposite top 812 towards top portion 820. The lower body portion 822 is devoid of windows, e.g., windows 720 of first cell 711. In some embodiments, lower body portion 822 is devoid of any openings.

In alternative embodiments, second cell 713 includes a different configuration of one or more vents 821. For example, and without limitation, second cell 713 may include a single vent in body portion 814, one or more vents 821 in top 812, irregularly spaced vents 821 around body portion 814, two to four vents 821 in body portion 814, four to six vents 821 in body portion 814, six or more vents 821 in body portion 814, or the like.

In some alternative embodiments, second cell 713 includes a bottom portion similar to top portion 812. Such a bottom portion includes an opening, aperture, or the like to allow for fluid communication between the internal regions 34 of first cell 711 and second cell 713.

Referring now to FIG. 23, a bottom view of second cell 713 is illustrated. Second cell 713 includes a tongue 825 extending from the lower terminus of body portion 814. Tongue 825 is shaped and adapted to engage with a corresponding groove in the top of first cell 711. The top of first cell 711 extending horizontally from top edge 741 of first cell 711. Tongue 825 and the corresponding groove are adapted to form a watertight or substantially watertight connection between first cell 711 and second cell 713. In alternative embodiments, second cell 713 does not include tongue 825, and first cell 711 does not include a groove.

Figure 24:
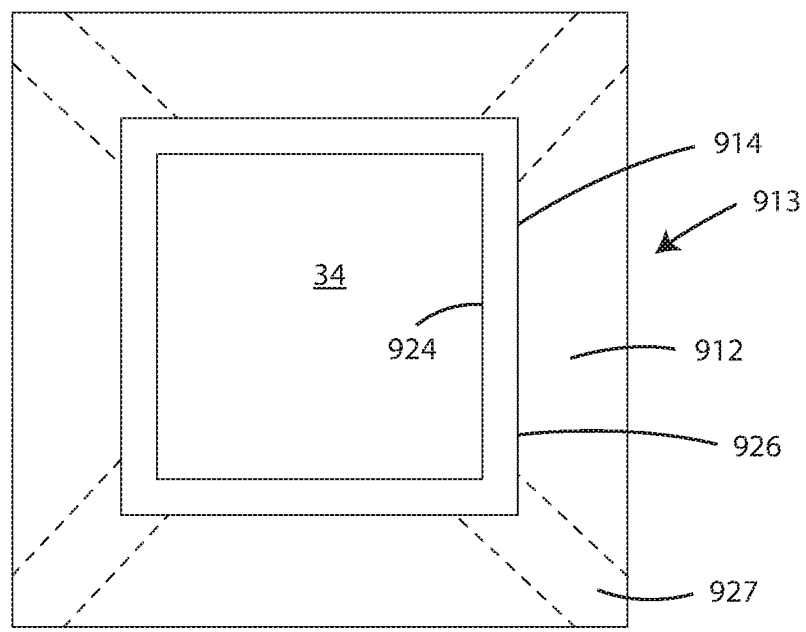
FIG. 24 is a bottom view of an alternative second cell of a stacked pair of cells.

Referring now to FIG. 24, an alternative second cell 913 is illustrated according to one embodiment. Second cell 913 includes a cylindrical body portion 914 that defines internal region 34. Cylindrical body portion 914 further defines inner surface 924 and outer surface 926. Inner surface 924 and outer surface 926 are not curved. Top portion 912 may optionally include beams 927 illustrated in dashed lines.

Figure 25:
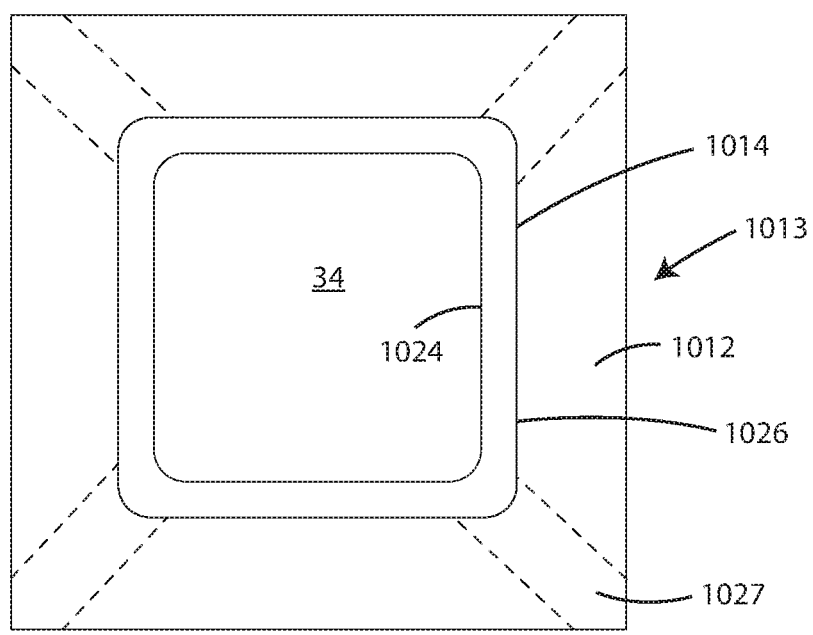
FIG. 25 is a bottom view of a further alternative second cell of a stacked pair of cells.

Referring now to FIG. 25, a further alternative second cell 1013 is illustrated according to one embodiment. Second cell 1013 includes a cylindrical body portion 1014 that defines internal region 34. Cylindrical body portion 1014 further defines inner surface 1024 and outer surface 1026. Inner surface 1024 and outer surface 1026 include both curved and straight portions. Top portion 1012 may optionally include beams 1027 illustrated in dashed lines.

Referring generally to FIGS. 23-25, a variety of cylindrical body portions can be used to form a second cell. The second cell can have any cylindrical cross section or other cross section able to perform the functions of the second cell described herein.

Although depicted as having two levels off cells 702, it should be understood that stormwater management system 700 can have a single level of cells 702 in some embodiments. In such cases, cells 702 may include a top and/or bottom portion. In these embodiments, stormwater management system 700 is similar to the stormwater management system 300 depicted in FIGS. 10-11.

Referring generally to the Figures, one or more features of each embodiment of the stormwater management system and individual cells described herein may be combined with other embodiments described herein without departing from the scope of the disclosure. For example, the features and functions of the stormwater management system and cells described with reference to FIGS. 17-25 may be adapted for use in a hexagonal cell system of the type described herein with reference to FIGS. 1-11.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, the order in which the steps of any method claim that follows are presented should not be construed in a manner limiting the order in which such steps must be performed.

What is claimed is:

1. A stormwater management system comprising:
   a plurality of first cells arranged in a lower level, each of the first cells having a body portion with an internal region, the first cells of the lower level being in fluid communication with one another to allow stormwater to flow from the internal region of one of the first cells to the internal region of another of the first cells;
   a plurality of second cells arranged in an upper level, each of the second cells having a body portion having an inner surface, the inner surface of each of the second cells having a substantially cylindrical shape and defining an internal region;
   each of the second cells being stacked on a corresponding one of the first cells, the first cells and the second cells in combination constituting a plurality of stacked pairs, each stacked pair of the plurality of stacked pairs including one of the first cells and one of the second cells;
   the first cells and the second cells being shaped and arranged such that for each stacked pair the internal region of the first cell is in fluid communication with the internal region of the second cell to permit stormwater to flow from the internal region of the first cell to the internal region of the second cell.

2. A stormwater management system according to claim 1, wherein the body portion of the second cells comprises a cylindrical body portion, the cylindrical body portion defining a first end, a second end opposite the first end, a lower body portion extending from the first end towards the second end, and a top portion extending from the second end towards the lower body portion, the first end defining a first opening adapted to permit passage of stormwater into and out of the interior region, the substantially cylindrically shaped inner surface defined by the cylindrical body portion, the lower body portion being devoid of windows.

3. A stormwater management system according to claim 2, wherein the cylindrical body portion comprises a right circular cylinder.

4. A stormwater management system according to claim 2, wherein each stacked pair is adapted to receive stormwater into the internal region of the first cell and, as stormwater rises above the first cell, to receive stormwater into the interior region of the second cell through the first end of the second cell, wherein the stormwater within the interior region of the second cell is contained by the body portion being devoid of windows.

5. A stormwater management system according to claim 2, wherein each of the second cells further comprises a top, the top covering the second end.

6. A stormwater management system according to claim 5, wherein the top seals the second end, and wherein each of the second cells further comprises a vent in the top portion of the cylindrical body portion, the vent being adapted to permit a gas to exit the cylindrical body portion.

7. A stormwater management system according to claim 5, wherein the top comprises a vent, the vent being adapted to permit a gas to exit the cylindrical body portion.

8. A stormwater management system according to claim 1, wherein each stacked pair includes a first cell having at least one window in the body portion, the window adapted to permit stormwater to flow between the internal region of the first cell and the internal region of another of the first cells, and wherein the stacked pair includes a windowless second cell.

9. A stormwater management system according to claim 1, wherein, for each of the first cells, the body portion comprises a plurality of corner columns spaced from each other, a plurality of wall portions, a top, and a window, each wall portion extending from one of the corner columns towards another of the corner columns, the window being through at least one of the wall portions, the window being adapted to permit passage of stormwater into and out of the interior region of the first cell, the top including an opening in fluid communication with one of the plurality of second cells.

10. A stormwater management system according to claim 9, wherein each wall portion comprises an inner surface and an outer surface, the inner surface of each wall portion being curved.

11. A stormwater management system comprising:
a plurality of first cells arranged in a lower level, each of the first cells having a body portion with an internal region, the first cells of the lower level being in fluid communication with one another to allow stormwater to flow from the internal region of one of the first cells to the internal region of another of the first cells;
a plurality of second cells arranged in an upper level, each of the second cells having a body portion having an inner surface, the inner surface of each of the second cells having a substantially cylindrical shape and defining an internal region;
each of the second cells being stacked on a corresponding one of the first cells, the first cells and the second cells in combination constituting a plurality of stacked pairs, each stacked pair of the plurality of stacked pairs including one of the first cells and one of the second cells;
the first cells and the second cells being shaped and arranged such that for each stacked pair the internal region of the first cell is in fluid communication with the internal region of the second cell to permit stormwater to flow within each stacked pair from the internal region of the first cell directly to the internal region of the second cell.

12. A stormwater management system according to claim 11, wherein the body portion of the second cells comprises a cylindrical body portion, the cylindrical body portion defining a first end, a second end opposite the first end, a lower body portion extending from the first end towards the second end, and a top portion extending from the second end towards the lower body portion, the first end defining a first opening adapted to permit passage of stormwater into and out of the interior region, the substantially cylindrically shaped inner surface defined by the cylindrical body portion, the lower body portion being devoid of windows.

13. A stormwater management system according to claim 12, wherein the cylindrical body portion comprises a right circular cylinder.

14. A stormwater management system according to claim 12, wherein each stacked pair is adapted to receive stormwater into the internal region of the first cell and, as stormwater rises above the first cell, to receive stormwater into the interior region of the second cell through the first end of the second cell, wherein the stormwater within the interior region of the second cell is contained by the body portion being devoid of windows.

15. A stormwater management system according to claim 12, wherein each of the second cells further comprises a top, the top covering the second end.

16. A stormwater management system according to claim 15, wherein the top seals the second end, and wherein each of the second cells further comprises a vent in the top portion of the cylindrical body portion, the vent being adapted to permit a gas to exit the cylindrical body portion.

17. A stormwater management system according to claim 15, wherein the top comprises a vent, the vent being adapted to permit a gas to exit the cylindrical body portion.

18. A stormwater management system according to claim 11, wherein each stacked pair includes a first cell having at least one window in the body portion, the window adapted to permit stormwater to flow between the internal region of the first cell and the internal region of another of the first cells, and wherein the stacked pair includes a windowless second cell.

19. A stormwater management system according to claim 11, wherein, for each of the first cells, the body portion comprises a plurality of corner columns spaced from each other, a plurality of wall portions, a top, and a window, each wall portion extending from one of the corner columns towards another of the corner columns, the window being through at least one of the wall portions, the window being adapted to permit passage of stormwater into and out of the interior region of the first cell, the top including an opening in fluid communication with one of the plurality of second cells.

20. A stormwater management system according to claim 19, wherein each wall portion comprises an inner surface and an outer surface, the inner surface of each wall portion being curved.

* * * * *